US012809692B2

(12) United States Patent
Sikand et al.

(10) Patent No.: US 12,809,692 B2
(45) Date of Patent: Nov. 24, 2026

(54) METHOD, SYSTEM AND COMPUTER READABLE MEDIA FOR SUSTAINABLE UTILIZATION OF LARGE LANGUAGE MODELS

(71) Applicant: Accenture Global Solutions Limited, Dublin (IE)

(72) Inventors: Samarth Sikand, Jaipur (IN); Rohit Mehra, New Delhi (IN); Priyavanshi Pathania, Chandigarh (IN); Nikhil Bamby, Amritsar (IN); Vibhu Saujanya Sharma, Bangalore (IN); Vikrant Kaulgud, Bangalore (IN); Sanjay Podder, Thane (IN); Adam Patten Burden, Tampa, FL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 175 days.

(21) Appl. No.: 18/819,896

(22) Filed: Aug. 29, 2024

(65) Prior Publication Data

US 2026/0064493 A1 Mar. 5, 2026

(51) Int. Cl.
*G06F 9/50* (2006.01)
*G06Q 10/0637* (2023.01)

(52) U.S. Cl.
CPC ..... *G06F 9/5094* (2013.01); *G06Q 10/06375* (2013.01)

(58) Field of Classification Search
CPC ........ G06F 1/3203; G06F 1/3206; G06F 1/26; G06F 1/329; G06F 2209/501; G06F 2209/503; G06F 2209/509
See application file for complete search history.

(56) References Cited

U.S. PATENT DOCUMENTS

| | | | | |
|---|---|---|---|---|
| 11,481,620 | B2 | 10/2022 | Khapali et al. | |
| 11,694,124 | B2 * | 7/2023 | Ramalingam .......... | G06N 20/00 706/12 |
| 12,106,205 | B1 * | 10/2024 | Jain ........................ | G06N 3/084 |
| 2024/0298169 | A1 * | 9/2024 | Wang ...................... | H04L 41/16 |

(Continued)

OTHER PUBLICATIONS

Accenture—"MCP-Bench: Benchmarking Tool-Using LLM Agents with Complex Real-World Tasks via MCP Servers"; 52 pages, Dated Aug. 28, 2025 (Year: 2025).*

(Continued)

*Primary Examiner* — Brian T Misiura
(74) *Attorney, Agent, or Firm* — Mannava & Kang, P.C.

(57) ABSTRACT

Methods, systems, and computer-readable media for ranking large language models (LLMs). Input including list of LLMs, list of hardware and artificial intelligence (AI) prompt are provided by the user for ranking the LLMs. Based on the input, first estimating minimum number of hardware units needed to process AI prompt on each LLM/hardware combination and second estimating time to process the AI prompt using each LLM/hardware combination. Based on minimum number of hardware units and time to process AI prompt, third estimating amount of energy consumed by each LLM/hardware combination. Based on energy consumed, ranking LLM/hardware combinations for AI prompt. Based on ranking, selecting LLM and hardware, submitting AI prompt to LLM on hardware, and receiving response to submitted AI prompt from LLM.

15 Claims, 8 Drawing Sheets

(56) References Cited

U.S. PATENT DOCUMENTS

| | | | | |
|---|---|---|---|---|
| 2025/0148209 | A1* | 5/2025 | Jadhav .................. | G06F 40/284 |
| 2025/0238265 | A1* | 7/2025 | Poothiyot ............. | G06F 9/5027 |

OTHER PUBLICATIONS

Faiz, et al., "LLMCarbon: Modeling the End-to-End Carbon Footprint of Large Language Models," ICLR, Jan. 19, 2024, arXiv:2309.14393v2 [cs.CL], 15 pages.
Duran, et al., "GAISSALabel: A Tool for Energy Labeling of ML Models," arXiv:2401.17150v1 [cs.SE] Jan. 30, 2024, 5 pages. [https://arxiv.org/pdf/2401.17150].
Bouza, et al., "How to estimate carbon footprint when training deep learning models? A guide and review," Environ. Res. Commun, vol. 5, Nov. 2023, 115014, 26 pages.
Budennyy, et al., "eco2Al: Carbon emissions Tracking of Machine Learning Models as the First Step Towards Sustainable AI," Doklady Mathematics, vol. 106, Suppl. 1, 2022, 11 pages.

* cited by examiner

METHOD, SYSTEM AND COMPUTER READABLE MEDIA FOR SUSTAINABLE UTILIZATION OF LARGE LANGUAGE MODELS

FIELD OF THE INVENTION

Various embodiments described herein relate generally to computer-implemented method, computer system, and computer program product for sustainable utilization of large language models (LLMs).

BACKGROUND

In recent years, the proliferation of Large Language Models (LLMs) and Generative AI tools has significantly impacted the market, with organizations increasingly integrating these services into their workflows. A key concern is selecting LLM services that offer value while minimizing their carbon footprint. Existing tools for energy and carbon monitoring often face limitations, such as providing only high-level consumption views, being intrusive, and lacking compatibility. These limitations result in substantial discrepancies between estimated and actual carbon emissions. Moreover, current monitoring tools generate emission values only after LLM execution, restricting the ability to make preemptive decisions.

SUMMARY

Implementations of the present disclosure are generally directed to optimizing the selection of Large Language Models (LLMs) and hardware for processing AI prompts. The method involves estimating the hardware requirements, processing time, and energy consumption for each combination of LLM and hardware. By assessing these factors, the method effectively ranks the LLM/hardware combinations to identify the most efficient option. This approach streamlines the decision-making process, reducing the time and effort required to choose the optimal LLM and hardware configuration. Consequently, the proposed method enhances operational efficiency and supports sustainable practices by minimizing energy consumption, making it well-suited for enterprise applications.

In general, innovative aspects of the subject matter described in this specification provide a method for optimizing the processing of an AI prompt using a list of Large Language Models (LLMs) and hardware combinations. The method includes receiving an input from the user, which comprises a list of LLMs, a list of hardware, and an AI prompt. The method includes first estimating the minimum number of hardware units required to process the AI prompt for each LLM/hardware combination from the lists provided. The method includes second estimating the time required to process the AI prompt using each LLM in the list. The method includes third estimating, based on the estimated minimum number of hardware units and the estimated processing time, the amount of energy consumed by each LLM/hardware combination for the AI prompt. The method includes ranking the LLM/hardware combinations based on the estimated energy consumption. The method includes selecting, based on the ranking, an LLM and hardware combination from the lists provided. The method includes submitting the AI prompt to the selected LLM on the chosen hardware and receiving a response to the AI prompt from the selected LLM.

The present disclosure further describes systems for implementing the method provided herein. The present disclosure also describes computer-readable storage media coupled to one or more processors and having instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DRAWINGS

Various embodiments in accordance with the present disclosure will be described with reference to the drawings, in which.

Like reference numbers and designations in the various drawings indicate like elements.

DETAILED DESCRIPTION

Figure 1:
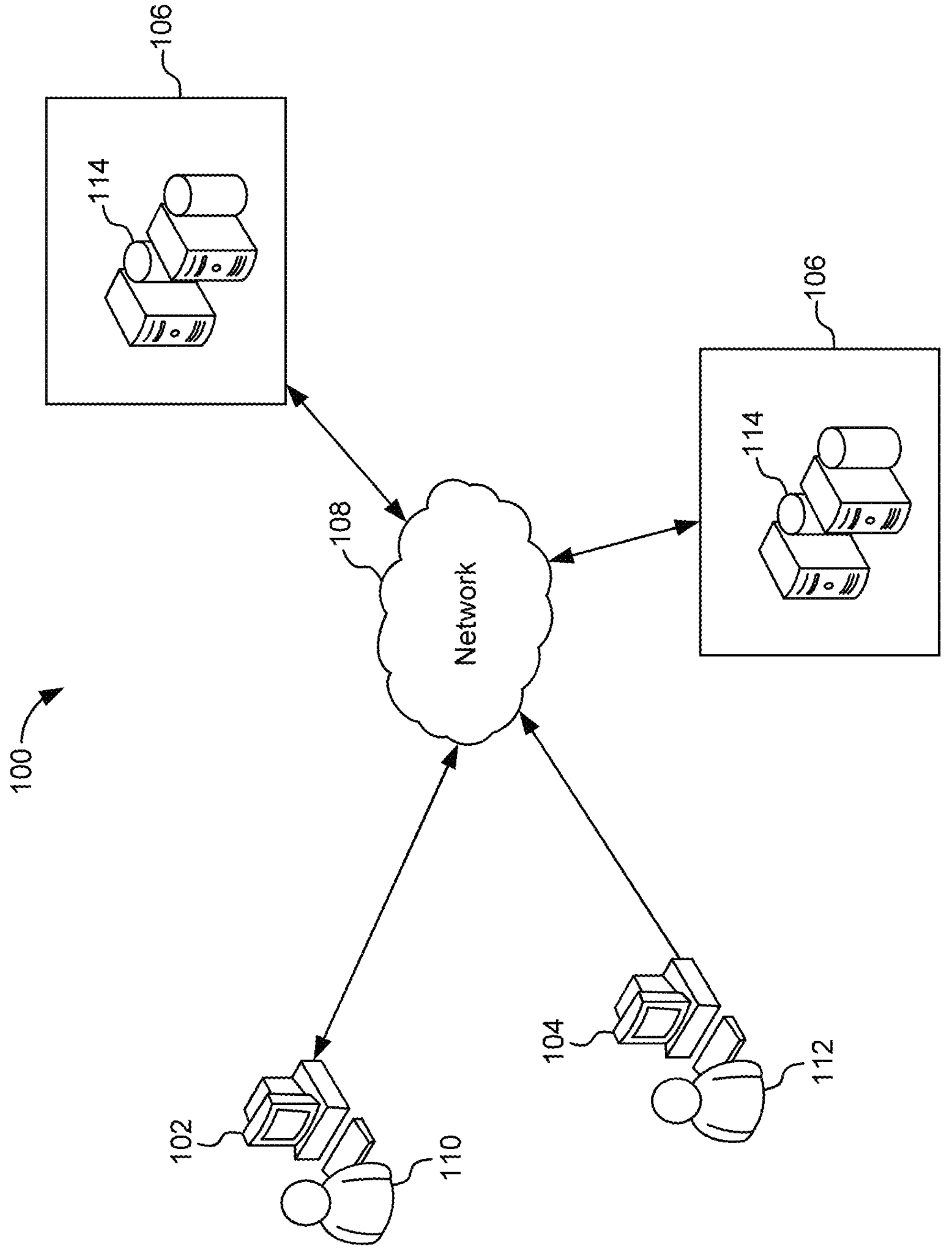
FIG. 1 depicts an example environment that may be used to execute implementations of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" herein (e.g., "for example," "an example of," by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series, and the like.

The term "a" means "one or more" unless the context clearly indicates a single element.

"First," "second," etc., are labels to distinguish components or blocks of otherwise similar names but does not imply any sequence or numerical limitation.

"Prompt" or the like refers to a submission to an AI model for processing.

"LLM" and the like refers to a large language model, which is an AI model that processes text-based input prompts.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the invention as set forth in the claims.

In recent years, the proliferation of Large Language Models (LLMs) and Generative AI tools has significantly impacted the market, with organizations increasingly integrating these services into their workflows. A key concern is selecting LLM services that offer value while minimizing their carbon footprint. Existing tools for energy and carbon monitoring often face limitations, such as providing only high-level consumption views, being intrusive, and lacking compatibility. These limitations result in substantial discrepancies between estimated and actual carbon emissions. Moreover, current monitoring tools generate emission values only after LLM execution, restricting the ability to make preemptive decisions.

Further, a technical problem with traditional methods of AI use is that LLM submissions consume a considerable amount of electricity and processing capacity, for which power availability and processing resources have become challenging to meet industry needs. For example, it has been estimated that a standard Google search consumes 0.3 Wh of electricity, whereas a ChatGPT-like search engine may use ~3-4 Wh of energy per request. With billions of searches done on Google daily, the ChatGPT-like search engine may consume 80 GWh of energy daily, and this will only grow as the use of AI expands. Providing power for this AI use is an industry-wide problem, and there is a recognized need for technical solutions that reduce power consumption for LLMs.

In view of this, implementations of the present disclosure enhance the selection of Large Language Models (LLMs) and hardware for processing AI prompts by estimating hardware requirements, processing times, and energy consumption for each LLM/hardware combination. The estimations facilitate the ranking of these combinations based on their energy efficiency. This enables more accurate and efficient selection of the optimal LLM and hardware configuration. Additionally, the implementations reduce reliance on manual processes, which are often disparate, time-consuming, and dependent on extensive expertise.

FIG. 1 depicts an example environment 100 that may be used to execute implementations of the present disclosure. In some examples, the example environment 100 enables ranking and selection of LLMs based on sustainability factors, including CO2 emissions.

As depicted in FIG. 1, the example environment 100 includes computing devices 102 and 104, back-end systems 106, and a network 108. In some examples, the computing devices 102 and 104 are used by respective users 110 and 112 to log into and interact with computing platforms executing applications according to implementations of the present disclosure. Examples of the computing devices 102 and 104 may include desktop computing devices, smartphones, laptops, tablet, voice-enabled devices, and/or the like. It is contemplated that implementations of the present disclosure may be realized with any appropriate type of computing device. In some examples, each of the computing devices 102 and 104 may include a web browser application executed thereon, which may be used to display one or more web pages of a computing platform executing applications. In some examples, each of the computing devices 102 and 104 may display one or more Graphical User Interfaces (GUIs) that enable the respective users 110 and 112 to interact with the computing platform.

In some examples, the network 108 includes a Local Area Network (LAN), a Wide Area Network (WAN), the Internet, or a combination thereof, and connects web sites, the computing devices 102 and 104, and the back-end systems 106. In some examples, the network 108 may be accessed over a wired and/or a wireless communication link. For example, a computing device like smartphone may utilize a cellular network to access the network 108.

In some examples, one or more of the back-end systems 106 may be implemented as an on-premises system that is operated by an enterprise or a third-party engaged in cross-platform interactions and data management. In some examples, the back-end systems 106 may be implemented as an off-premises system (for example: cloud or on-demand) that is operated by an enterprise or a third-party on behalf of an enterprise. In some examples, one or more of the back-end systems 106 may be implemented in a cloud environment. For simplicity, the back-end systems 106 depicted in FIG. 1 may be a cloud environment that is intended to represent various forms of servers including a web server, an application server, a proxy server, a network server, a server pool, and/or the like.

In some examples, each of the back-end systems 106 includes one or more ranking system 114 to host components (for example, software packages) of enterprise systems and applications. Further, the ranking system 114 accepts requests from the users 110 and 112 through the respective computing devices 102 and 104 for services being provided by the enterprise systems and the applications. In response to the accepted requests, the ranking system 114 provides the requested services to the computing devices 102 and 104 over the network 108.

The requests received from the users 110 and 112 through the respective computing devices 102 and 104 may be inputs. An input may include a list of large language models (LLM), a list of hardware, and an artificial intelligence (AI) prompt. The list of Large Language Models (LLMs) refers to a collection of various pre-trained language models designed for different natural language processing tasks, each having individual capabilities and characteristics. The list of hardware pertains to a compilation of diverse computing devices or systems available for executing AI applications, encompassing a range of performance specifications and configurations. The artificial intelligence (AI) prompt is a user-received prompt for requesting suggestions on LLMs for a specific implementation scenario.

The input may be provided in a plethora of modalities, including natural language text, encoded text, textual commands, voice/audio, video, haptic, graphic (i.e., images), and the like.

According to implementations of the present disclosure, the ranking system 114 may be adapted for ranking LLMs based on benefits of implementation in the specific implementation scenario. Numerous examples depicting the ranking of LLMs, and thereby selection of a given LLM based on the ranking are described in detail in conjunctions with figures below.

Figure 2:
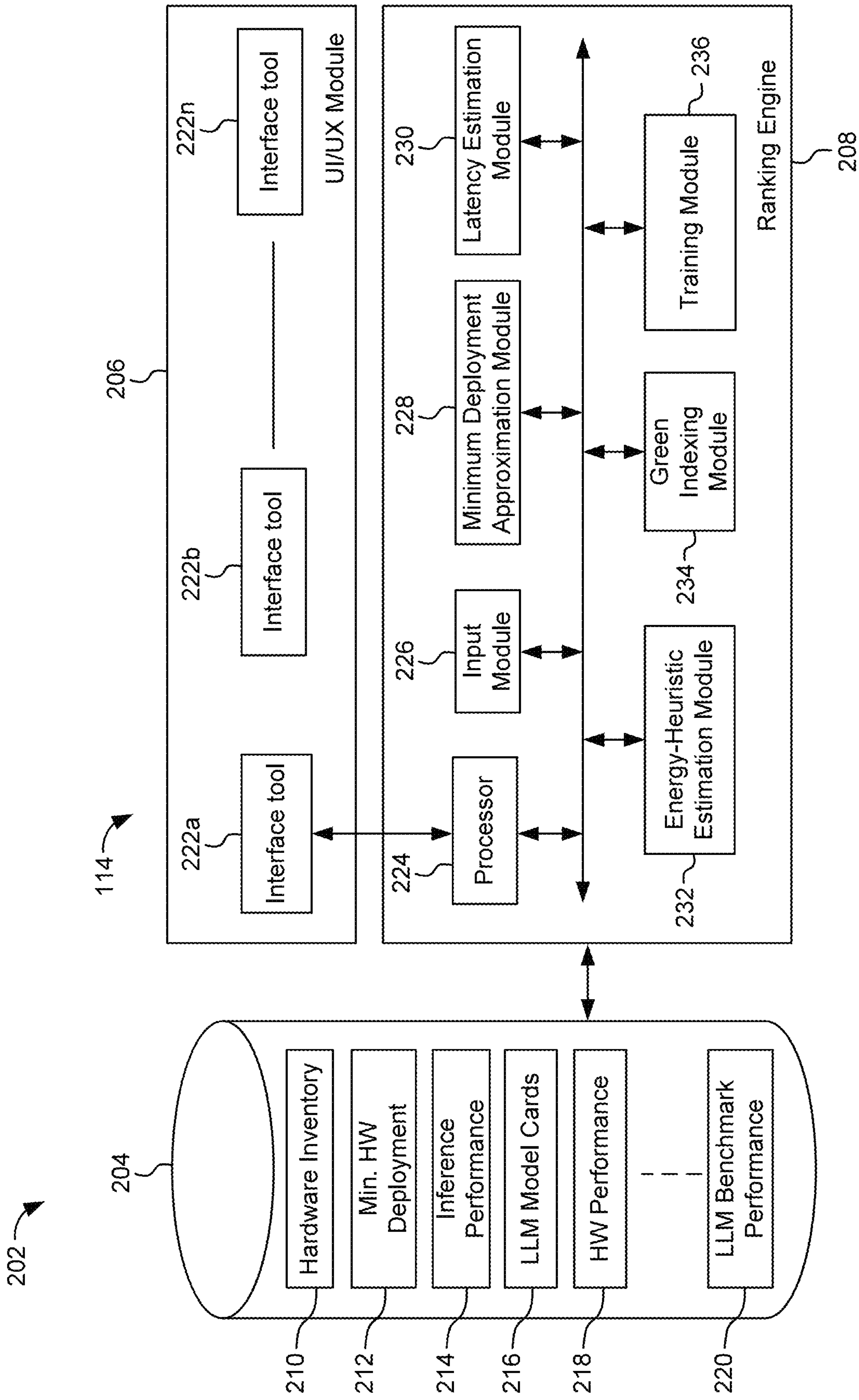
FIG. 2 depicts an example architecture of a ranking system in accordance with implementations of the present disclosure.

FIG. 2 depicts an example architecture 202 of a ranking system 114 in accordance with implementations of the present disclosure.

In an example, as depicted in FIG. 2, the ranking system 114 receives queries and generates content/responses such as, but are not limited to, text, images, audio, video, and/or the like, for the queries. The queries may include prompts for ranking/selecting an LLM based on organizational requirements. The responses may include at least a ranked list of LLMs based on sustainability and organizational requirements.

The ranking system 114 includes a knowledge base 204, a User Interface (UI)/User Experience (UX) module 206, and a ranking engine 208. The knowledge base 204 may be described as a structured repository or database associated with the ranking system 114. The knowledge base 204 may incorporate various knowledge representation schemes, such as ontologies, taxonomies, or semantic networks, to encode and organize information in a machine-understandable format, thereby enabling advanced search, inference, and reasoning capabilities. Furthermore, the knowledge base 204 may leverage advanced technologies, including natural language processing, machine learning, and knowledge engineering techniques, to enhance knowledge acquisition, update, and refinement processes, ensuring its continual relevance and adaptability to evolving needs and circumstances.

In some implementations, the knowledge base 204 includes hardware inventory 210, minimum hardware (HW) deployment 212, inference performance 214, LLM model cards 216, HW performance 218, LLM benchmark performance 220, metadata (not shown), and additional information (not shown) pertaining to the ranking system 114. The hardware inventory 210 consists of data encompassing various types of hardware used to deploy LLMs, such as GPUs and AI accelerators, with details on each model's technical specifications. Examples of the hardware inventory 210 include NVIDIA A100 (Max. Memory: 80 GB, Max FLOPs: 3.4 TFLOPS).

The minimum hardware (HW) deployment 212 refers to empirical data capturing the minimum number of hardware units required to deploy an LLM of a specific size, such as the number of parameters. The inference performance 214 includes empirical data on metrics like prompt-encoding latency and generation latency, measured on specific hardware. The HW performance 218 comprises empirical data on energy consumption and related metrics for running LLMs on specific hardware, captured by monitoring tools. For instance, Llama-2-7B running on a single A100 consumes 3.2 J of energy.

The LLM benchmark performance 220 consists of empirical data on LLM performance across benchmark datasets, evaluated using metrics such as Accuracy and F1-scores. Examples of benchmark datasets include MMLU, which measures knowledge across 57 subjects, and GSM8K, which consists of 8.5K diverse grade school math problems. The LLM model cards 216 provide details on LLM architectural aspects such as the number of Transformer layers, attention head size, and hidden size.

The metadata (not shown) provides descriptive information related to the data, including hardware inventory 210, minimum hardware deployment 212, inference performance 214, LLM benchmark performance 220, and LLM model cards 216, stored within the knowledge base.

The UI/UX module 206 may be defined as a module, which designs and manages a user interface (UI), via which the user interacts with the ranking system 114, and the user's experience (UX) during said interaction. The UI/UX module 206 may integrate various technologies and frameworks to optimize visual layout, interactive elements, and overall usability, often utilizing principles of human-computer interaction (HCI) and graphic design.

In some examples, the UI/UX module 206 may represent one or more front-end components/interfaces 222*a*-222*n* of a chatbot that may be executed on one or more of the computing devices 102 and 104 to enable receipt of the queries. In some examples, the query may be received through various modalities including, but not limited to, a question input to a chat bot, a request provided through a Graphical User Interface (GUI), an email, and/or the like.

The ranking engine 208 may be configured for ranking the LLMs based on the queries received through the UI/UX module 206. The ranking engine 208 includes one or more processors 224, an input module 226, a minimum deployment approximation module 228, a latency estimation module 230, an energy-heuristic estimation module 232, a green indexing module 234, and a training module 236.

The processor 224 may include, for example, microprocessors, microcomputers, microcontrollers, digital signal processors, central processing units, state machines, logic circuits, and/or any devices that manipulate data or signals based on operational instructions. Among other capabilities, the processor 224 may fetch and execute computer-readable instructions in a memory operationally coupled with the ranking system 114 for ranking the LLMs.

The input module 226 refers to a component used to receive and manage queries or other types of inputs from users. The input module 226 functions as an interface through which user inputs are captured and processed. The input module 226 is responsible for handling the submission of requests, validating input data, and directing it to the appropriate processing elements or services within the ranking system 114.

The minimum deployment approximation module 228 refers to a module utilized by the ranking system 114 for the first estimating. In this regard, the minimum deployment approximation module estimates a minimum number of hardware units required to process the AI prompt on each LLM/hardware combination from the list of LLMs and the list of hardware (i.e., estimated hardware requirement for deploying a Large Language Model (LLM) with specified characteristics). The minimum deployment approximation module 228 evaluates the hardware requirements based on the LLM's parameters and the capabilities of the hardware models available. The minimum deployment approximation module 228 exhibits dynamic optimization capabilities, adapting its estimates based on the level of hardware and deployment information provided. For example, if deploying a model with 175 billion parameters on a specific hardware like NVIDIA A100 GPUs, the module estimates the number of GPUs required to meet performance and efficiency standards. Similarly, if deploying a smaller model like GPT-2 on a less powerful hardware configuration, the module adjusts its estimates accordingly to provide a scalable solution.

The latency estimation module 230 refers to a module utilized by the ranking system 114 for the second estimating. In this regard, the latency estimation module 230 is responsible for estimating time taken to process the AI prompt using each LLM in the list of LLMs (i.e., the runtime latency required to process a prompt and generate output tokens). The latency estimation module 230 utilizes a Dynamic Prompt-based Runtime Estimation approach, which incorporates a custom hybrid method combining analytical and regression-based techniques. An analytical component calculates latency based on factors such as prompt complexity and model architecture, while the regression-based component predicts latency using historical data and performance metrics. For example, when estimating how long it will take for a model like GPT-3 to process a detailed user query and generate a response, the latency estimation module 230 provides estimates for both prompt encoding and the generation of each output token, adjusting dynamically according to the specific characteristics of the prompt and historical performance data.

The energy-heuristic estimation module 232 refers to a module utilized by the ranking system 114 for the third estimating. In this regard, the energy-heuristic estimation module 502 utilizes the estimated minimum number of hardware units (first estimating) from the minimum deployment approximation module 228 and the estimated time (second estimating) from the latency estimation module 230 to determine an estimated amount of energy consumed by each of the LLM/hardware combinations for the AI prompt (energy consumption). The energy-heuristic estimation module 232 incorporates a Multi-factor Energy Heuristic Estimation approach, utilizing a heuristic method combined with a non-linear convex optimization function. This function considers multiple factors, such as model architecture and benchmark scores, to provide accurate estimates of energy usage for LLM inference. For example, when estimating the energy required for an LLM to process a prompt, the energy-heuristic estimation module 232 uses the optimization function to abstract and model energy consumption based on LLM performance data and benchmark results.

The green indexing module 234 refers to a module utilized by the ranking system 114 for ranking the LLM/hardware combinations. In this regard, the green indexing module 234 utilizes the estimated amount of energy consumed to rank the LLM/hardware combinations. Specifically, the green indexing module estimates carbon emissions for each permutation of user-specified prompts and selected LLM/hardware combinations, providing a green indexing for end-users. The green index delivers a context-specific weighted priority list of LLM models and services, highlighting the optimal options based on minimal carbon footprint while maximizing response performance and accuracy. For example, when a user provides a query and selects a range of LLMs, the green indexing module 234 evaluates each LLM's environmental impact and performance, generating a ranked list that emphasizes the most eco-friendly and efficient LLMs.

The training module 236 is defined as a component for training and re-training various components of the ranking system 114. The training module 236 focuses on enhancing the performance and accuracy of several submodules, including the minimum deployment approximation module 228, the latency estimation module 230, the energy-heuristic estimation module 232, and the green indexing module 234. The training module 236 updates these components by using empirical data and performance metrics to improve their estimation capabilities and optimize their outputs. For example, it refines the minimum deployment approximation module 228 to better predict hardware requirements, enhances the latency estimation module 230 to provide more accurate runtime predictions, improves the energy-heuristic estimation module 232 to better estimate energy consumption, and updates the green indexing module 234 to provide more accurate carbon footprint assessments.

Once additional data points are available (for example, by observing working of the ranking system 114, and capturing data pertaining to the same), the training module 236 re-trains one or more of the components of the ranking system 114. In this regard, the training module 236 may re-train at least one of the minimum deployment approximation module 228, the latency estimation module 230, the energy-heuristic estimation module 232, and the green indexing module 234.

Figure 3:
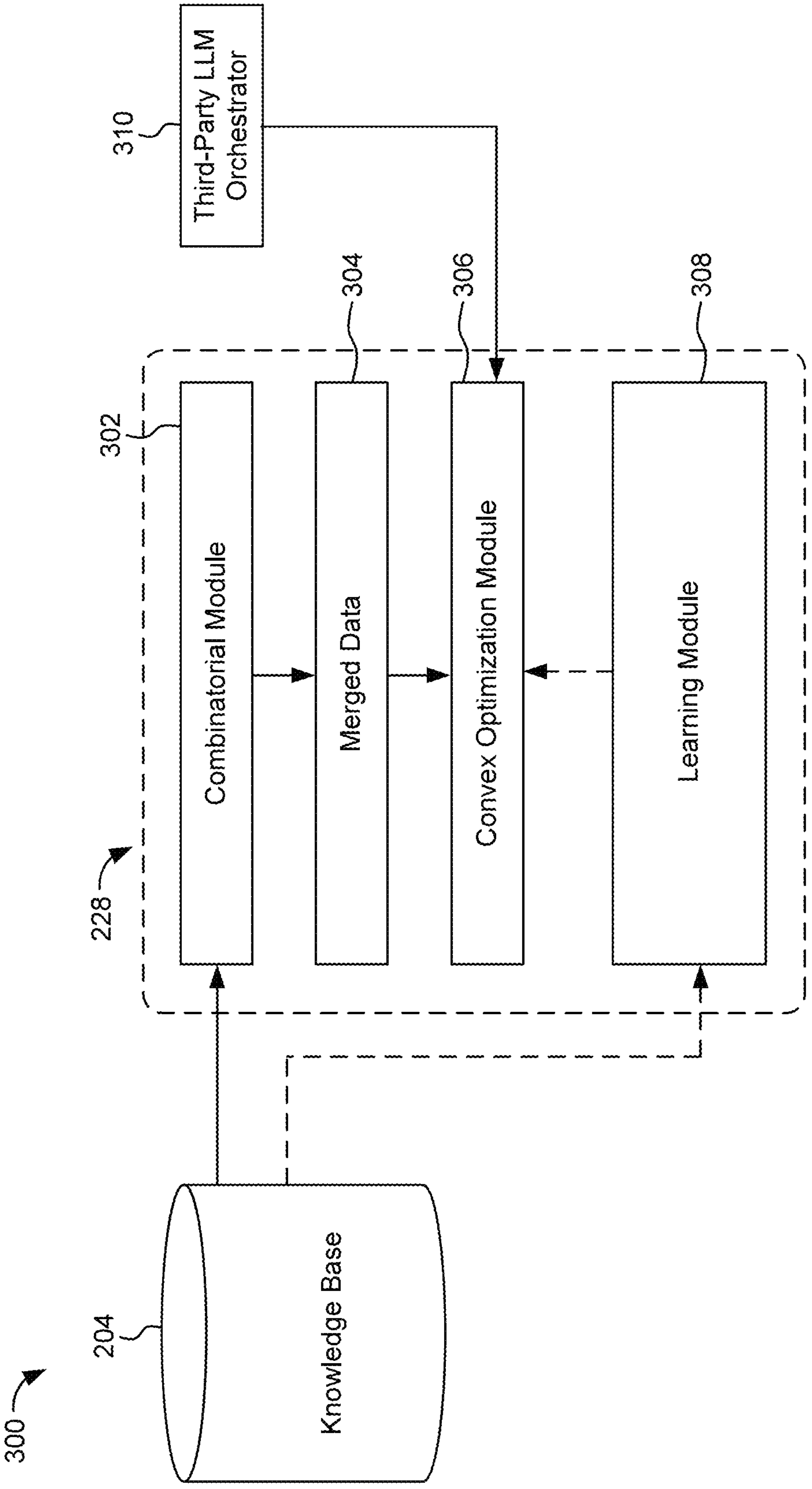
FIG. 3 depicts a block diagram that presents an example of a minimum deployment approximation module for a first estimating, in accordance with implementations of the present disclosure.

FIG. 3 depicts a block diagram 300 that presents an example of the minimum deployment approximation module 228 for the first estimating, in accordance with implementations of the present disclosure. The ranking system 114 utilizes the minimum deployment approximation module 228 for the first estimating.

The minimum deployment approximation module 228 performs the first estimating by approximating a minimum number of hardware units required to run a particular LLM with optimal deployment configuration. The minimum deployment approximation module 228 may receive the hardware inventory and the minimum hardware deployment information from the knowledge base 204. Advantageously, accurate estimates are generated when the hardware inventory and the minimum hardware deployment information are utilized in conjunction by the minimum deployment approximation module 228. The hardware inventory includes information pertaining to various compatible hardware, along with relevant characteristics (for example, type, model, etc.) of each. For example, a hardware information in the hardware inventory may be implemented as NVIDIA A100-80 GB. Exemplary tabular representations of the hardware inventory and the minimum hardware deployment information are iterated in Tables 1 and 2, respectively, as illustrated below:

TABLE 1 exemplary representation of hardware inventory information

| Vendor | Hardware Model | Maximum Memory | TDP (W) |
|---|---|---|---|
| NVIDIA | A100 | 80 GB | 300 |
| NVIDIA | H100 | 40 GB | 700 |
| Intel | Gaudi | 60 GB | 250 |

TABLE 2 exemplary representation of minimum hardware deployment information

| LLM | Size (no. of parameters) | Hardware Model | Precision | Minimum units |
|---|---|---|---|---|
| LLM1 | 70 B | A100 | Fp32 | 1 |
| LLM2 | 30 B | H100 | Bf16 | 3 |
| LLM3 | 12 B | Gaudi | Fp16 | 2 |
| LLM1 | 70 B | Gaudi | Bf16 | 2 |

The minimum deployment approximation module 228 is trained for estimating a minimum number of hardware units required for processing the AI prompt. Once trained, the minimum deployment approximation module 228 is utilized by the ranking system 114 at runtime. In some instances, as previously discussed, the minimum deployment approximation module 228 may be re-trained based on additional data points collected during runtime.

As shown in FIG. 3, the minimum deployment approximation module 228 comprises a combinatorial module 302, merged data 304, convex optimization module 306, and a learning module 308. The combinatorial module 302 refers to a component designed to extract and analyze key hardware specifications and empirical performance data related to hardware (for example, accelerators). The combinatorial module 302 retrieves detailed information such as a Thermal Design Power (TDP), a Maximum Available Memory, and the Computation Capacity. Thermal Design Power (TDP) represents power consumption of the ranking system 114 under its maximum theoretical load. The maximum available memory indicates a total memory accessible to the hardware. The computation capacity reflects the hardware's maximum processing power. Specifically, the computation capacity may refer to processing capacity with respect to a maximum floating-point operation the hardware may achieve. The computation capacity may be measured in teraflops (TFLOPS).

Further, the combinatorial module 302 utilizes the hardware inventory information and the minimum hardware deployment information to generate merged data 304. In this regard, the combinatorial module 302 matches hardware names from the hardware inventory information and the minimum hardware deployment information by cross-referencing between the two sets of information to generate the merged data 304. In an example, the combinatorial module 302 may select a hardware listing 'H100' from the minimum hardware deployment information, and map the hardware listing (H100) with the hardware inventory information. In this regard, the combinatorial module 302, may extract information pertaining to the hardware (for example, hardware specifications) and include the same when generating the merged data 304.

The combinatorial module 302 extracts empirical data points from benchmarks (i.e., the minimum hardware deployment information) to assess the optimal deployment infrastructure for the hardware. Empirical data points refer to data obtained from experiments or inferencing of the LLMs. By integrating these hardware specifications with performance metrics under various configurations, the combinatorial module 302 provides valuable insights that aid in optimizing both hardware selection and system setup. For example, if the module analyzes a GPU with a TDP of 250 watts, 16 GB of memory, and a computation capacity of 10 teraflops, it might recommend minimum hardware required for deployment configurations to achieve best performance based on the merged data 304.

Merged data 304 refers to an exhaustive data base of deployment information, which may be utilized to compute various aspects of the ranking system 114. With respect to the present implementation, the merged data 304 is an exhaustive data base of LLM deployment information, which is utilized to compute the minimum hardware requirement for deploying any LLM. An exemplary tabular representation of the merged data 304 is iterated in Table 3, as illustrated below:

TABLE 3 exemplary representation of merged data 304

| LLM | Parameters | Hardware Model | Minimum units | Memory |
|---|---|---|---|---|
| LLM1 | 70 B | A100 | 1 | 80 GB |
| LLM2 | 30 B | H100 | 3 | 40 GB |
| LLM3 | 12 B | Gaudi | 2 | 60 GB |
| LLM1 | 70 B | Gaudi | 2 | 60 GB |

Additionally, the merged data 304 is provided to the convex optimization module 306 by the combinatorial module 302. The merged data 304 may also be referred to as a map of data points for each LLM/hardware combination. The convex optimization module 306 refers to a component which calculates the hardware requirement for deployment of an LLM based on the merged data 304. In this regard, the convex optimization module 306 formulates and solves linear convex optimization problems to determine optimal deployment parameters for the LLMs. This is used to calculate the hardware requirements (mainly including number of units, memory requirements, and the like) for deploying the LLM based on its characteristics (such as, number of parameters, precision, and the like).

The convex optimization module 306 calculates the hardware requirement for deployment of the LLM based on one or more supervised learning techniques or semi-supervised learning techniques. Supervised learning techniques include regression modelling techniques, neural network techniques, similarity learning techniques, and the like. Semi-supervised learning techniques include Laplacian regularization techniques, co-training techniques, k-nearest neighbor techniques, regression splines techniques, and the like. In some instances, the convex optimization module 306 calculates the hardware requirement for deployment of the LLM based on one or more regression modelling techniques. Examples of the regression modelling techniques include a random forest technique, a linear regression technique, a ridge regression technique, a support vector regression (SVR) technique, a naïve-bayes technique, a decision tree regression technique, a stochastic gradient descent regression technique, and the like.

Typically, regression modelling techniques are utilized when an output to be computed is a numerical value. In the present implementation, the regression modelling techniques utilize loss functions to optimize internal variables of the regression technique, which, in-turn, enables accurate calculation of the hardware requirements (which have numerical values). During training, the convex optimization module 306 will utilize the merged data 304 to understand correlations between LLMs (for example, number of parameters), hardware (for example, hardware to be utilized for executing the LLM), and eventual hardware requirements (for example, number of hardware units). During training, variables of the convex optimization module 306 may be re-adjusted to optimize performance. Once the convex optimization module 306 is able to accurately estimate hardware requirements, it is implemented within the ranking system 114 for runtime utilization (i.e., an inference phase).

Further, the convex optimization module 306 employs independent variables corresponding to all relevant parameters, both necessary and optional, which are constrained based on the deployment context. These parameters include details related to the LLM's architecture, such as the number of parameters and precision bits, as well as characteristics of the chosen accelerator, including maximum available memory and supported precision levels. This data (i.e., merged data 304) is used to navigate the n-dimensional search space, optimizing the function by descending to an optimal local minimum. This approach ensures that the memory requirements and deployment parameters for the LLM are determined efficiently within the specified constraints.

During inference/runtime, the convex optimization module 306 utilizes the LLM information to estimate hardware requirements based on its understanding of correlations between LLMs, hardware, and hardware requirements. In this regard, the convex optimization module 306 utilizes the regression modelling techniques for estimating the hardware requirements. For example, if the convex optimization module 306 is given an LLM with 500 million parameters and high precision requirements, it may use the regression modelling techniques to find the minimal hardware requirements for deploying the model efficiently. The resulting output provides the precise hardware allocation necessary to ensure effective deployment while adhering to resource constraints.

The learning module 308 refers to a component that executes the optimizer function at regular intervals as new experimental data becomes available. The learning module 308 determines when to trigger the re-optimization of the convex function through a multi-criteria decision heuristic, which considers factors such as the number of data points collected, the timeline for new hardware releases, and delta updates to existing hardware versions. By assessing these criteria, the learning module 308 ensures that re-optimization is performed at most advantageous times, thereby enhancing accuracy of the function's predictions. This allows the learning module 308 to continuously refine its predictions and deployment strategies for LLMs based on the most current data and hardware information.

At runtime, the minimum deployment approximation module 228 identifies the minimum number of units of hardware for each LLM to process the prompt, based on the map of data points. In operation, when a new LLM is passed to the Minimum Deployment Approximation Module 228 along with its reference deployment type, the Minimum Deployment Approximation Module 228 returns the minimum number of units required (utilizing the trained convex optimization module 306). This information is then provided to the subsequent modules for further processing. The Minimum Deployment Approximation Module 228 ensures that the deployment is optimized based on the LLM's characteristics and specific requirements.

The convex optimization module 306 is communicably coupled to a third-party LLM orchestrator 310. In such, the third-party LLM orchestrator 310 provides the list of LLMs, and the list of hardware to the convex optimization module 306. The third-party LLM orchestrator 310 refers to a tool or framework that manages routing of incoming user queries to the ranking system 114, as well as various components of the ranking system 114, for example, the minimum deployment approximation module 228.

Typically, the orchestrator evaluates each user query and determines which LLM is best suited to handle it, based on specific criteria and business rules. In this regard, the orchestrator ensures that the queries are directed to the model most capable of providing accurate and relevant responses. By leveraging a set of predefined criteria and business rules, the Third-Party LLM Orchestrator 310 optimizes query handling and improves the overall efficiency and effectiveness of the LLM deployment. In operation, the ranking system 114 assists functions of the third-party LLM orchestrator 310 in identifying an appropriate LLM to utilize for specific business requirements. Advantageously, the third party LLM orchestrator 310 may optimize LLM selection based on the LLM's characteristics and specific requirements.

Further, the minimum deployment approximation module 228 provides estimated minimum units for deployment of each LLM and hardware combination to the energy-heuristic estimation module 232.

Figure 4:
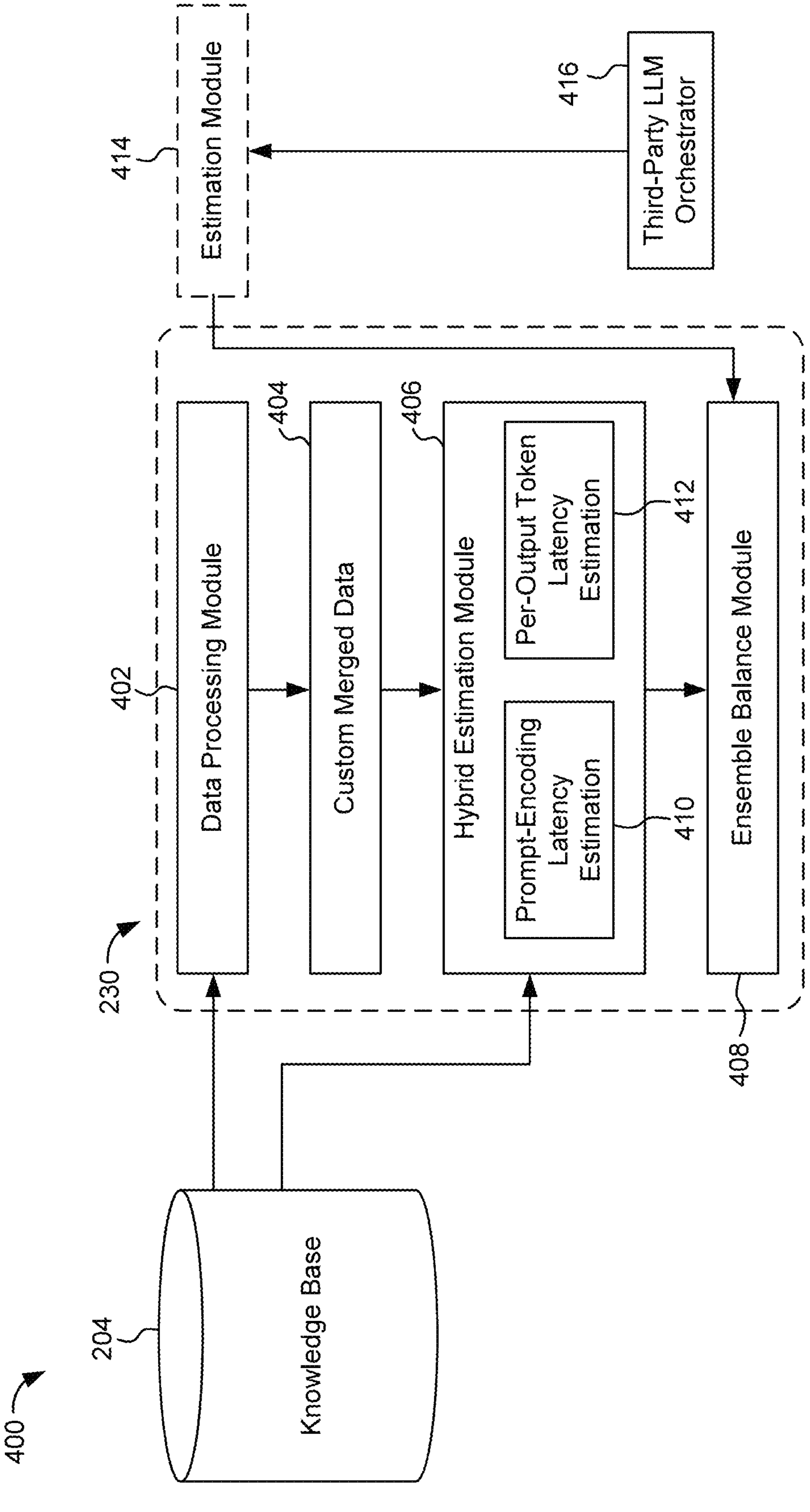
FIG. 4 is a block diagram that presents an example of a latency estimation module for a second estimating, in accordance with implementations of the present disclosure.

FIG. 4 is a block diagram 400 that presents an example of the latency estimation module 230 for the second estimating, in accordance with implementations of the present disclosure. The ranking system 114 utilizes the latency estimation module 230 for the second estimating.

The latency estimation module 230 is performs the second estimating by determining the estimated time to process the AI prompt using each LLM in the list of LLMs. The estimated time to process the AI prompts refers to a runtime latency for processing user prompts through a specific LLM. This latency estimation module 230 leverages both analytical and regression-based methods to predict time required for LLMs to process and generate responses to user queries. The latency estimation module 230 may receive LLM architecture, the inference performance, and the hardware inventory from the knowledge base 204. By integrating such varied data, the latency estimation module 230 can accurately estimate latency. For example, if the latency estimation module 230 receives information about an LLM with 24 transformer layers and 12 attention heads, along with hardware performance data, it can calculate the expected latency for encoding a prompt and generating output tokens.

The advantage of the latency estimation module 230 lies in its ability to provide precise predictions of processing times, which is crucial for optimizing LLM performance and resource allocation. Accurate latency estimates allow for better planning and scaling of resources, ultimately improving the efficiency of LLM deployments. Additionally, adaptability to varying LLM architectures and hardware setups ensures that latency predictions are relevant and tailored to specific configurations.

The LLM architecture information relates to information pertaining to each LLM. This information may include at least one of a number of parameters, a number of layers, a hidden size, and the like. The inference performance metrics refers to metrics pertaining to performance of each LLM with respect to various criteria. These criteria may include at least one of a number of input tokens, a number of output tokens, a prompt-encoding latency, a per-output token latency, and the like. Exemplary tabular representations of the LLM architecture information and the inference performance metrics are iterated in Tables 4 and 5, respectively, as illustrated below:

TABLE 4 exemplary representation of LLM architecture information

| LLM | No. of parameters | No. of layers | Hidden Size | Attention heads |
|---|---|---|---|---|
| LLM 1 | 70 B | 120 | 4096 | 96 |
| LLM 2 | 30 B | 64 | 1229 | 22 |
| LLM 3 | 12 B | 50 | 333 | 45 |
| LLM 4 | 7 B | 21 | 1124 | 32 |

TABLE 5 exemplary representation of inference performance metrics

| LLM | Input tokens | Output tokens | Prompt-encoding latency | Per-output token latency |
|---|---|---|---|---|
| LLM 1 | 250 | 120 | 0.02 | 0.12 |
| LLM 2 | 1920 | 64 | 0.04 | 0.2 |
| LLM 3 | 500 | 50 | 0.03 | 0.3 |
| LLM 1 | 320 | 21 | 0.05 | 0.5 |

The latency estimation module 230 is trained for estimating the prompt-encoding latency and the per-output token latency. Once trained, the latency estimation module 230 is utilized by the ranking system 114 at runtime. In some instances, as previously discussed, the latency estimation module 230 may be re-trained based on additional data points collected during runtime.

As shown in FIG. 4, the latency estimation module 230 comprises a data processing module 402, custom merged data 404, a hybrid estimation module 406, and an ensemble balance module 408. The data processing module 402 receives and processes critical input from the knowledge base 204, which includes detailed information on LLM architectures, inference performance metrics, and hardware inventory data. For instance, the data processing module 402 might retrieve data on an LLM's number of transformer layers, attention heads, and computational capacity, as well as hardware details like maximum memory and latency benchmarks. By consolidating this information, the data processing module 402 forms a comprehensive view of the factors affecting latency.

The data processing module 402 refers to a component responsible for extracting and consolidating critical information from the knowledge base 204. Specifically, the data processing module 402 retrieves details about the LLM architecture and the inference performance metrics. For instance, the data processing module 402 collects data such as the number of transformer layers and attention heads of an LLM, as well as hardware specifications like maximum memory and latency benchmarks. This comprehensive data is essential for forming a detailed understanding of latency factors. The advantage of the data processing module 402 is that it provides a thorough view of latency influences, enabling more accurate estimations and optimizing overall system performance. The data processing module 402 utilizes this data to generate the custom merged data 404.

In this regard, the data processing module 402 matches LLM names from the inference performance metrics and the LLM architecture information by cross-referencing between the two sets of information to generate the custom merged data 404. In an example, the data processing module 402 may select an LLM listing LLM 1' from the inference performance metrics (notable, it will select and append both data points for LLM1), and map the LLM listing (LLM1) with the LLM architecture information. In this regard, the data processing module 402, may extract information pertaining to the LLM (for example, number of parameters) and include the same when generating the custom merged data 404.

The data processing module 402 follows an approach similar to the combinatorial module 302, as discussed above in detail with respect to FIG. 3, for generating the custom merged data 404. The custom merged data 404 refers to a dataset generated by the data processing module 402. This merged data combines LLM architecture details with hardware performance metrics to form a unified dataset that supports latency estimations. For example, if the merged data indicates that an LLM with 24 transformer layers and 12 attention heads is paired with hardware having 80 GB of memory, this information is used to predict how these factors influence processing time. The advantage of having custom merged data 404 is that it ensures a cohesive dataset is used for latency estimation, improving the precision of the estimates. The data processing module 402 provides the custom merged data 404 to the hybrid estimation module 406.

The custom merged data 404 is generated by the data processing module 402 and includes a unified dataset that combines LLM architecture details with hardware performance metrics. This merged data serves as a foundation for latency estimations. The custom merged data 404 refers to an exhaustive data base of LLM performance information, which may be utilized to compute various aspects of the ranking system 114. With respect to the present implementation, the custom merged data 404 is an exhaustive data base of LLM latency information, which is utilized to compute the runtime latency for any LLM. For example, if the merged data indicates that an LLM with 24 transformer layers and 12 attention heads runs on hardware with 80 GB of memory, this dataset helps in predicting how these factors influence processing time for a given prompt.

An exemplary tabular representation of the custom merged data 404 is iterated in Table 6, as illustrated below:

TABLE 6 exemplary representation of custom merged data 404

| LLM | Parameters | Input tokens | Output tokens | Prompt-encoding latency | Per-output token latency |
|---|---|---|---|---|---|
| LLM 1 | 70 B | 250 | 120 | 0.02 | 0.12 |
| LLM 2 | 30 B | 1920 | 64 | 0.04 | 0.2 |
| LLM 3 | 12 B | 500 | 50 | 0.03 | 0.3 |
| LLM 1 | 70 B | 320 | 21 | 0.05 | 0.5 |

Additionally, the custom merged data 404 is provided to the hybrid estimation module 406 by the data processing module 402.

The hybrid estimation module 406 refers to a component that applies both analytical and regression-based approaches to estimate runtime latency. In some instances, the hybrid estimation module 506 may utilize other supervised or semi-supervised learning techniques in place of the regression-based approaches. The hybrid estimation module 406 utilizes the hardware inventory information from the knowledge base 204 to estimate the latency. The hybrid estimation module 406 comprises two key functions: first generating an average time to generate a token for the AI prompt (the prompt-encoding latency estimation 410), and second generating an average time to generate a number of tokens generated for the AI prompt (the per-output token latency estimation 412).

The prompt-encoding latency estimation 410 calculates the time required to encode user prompts, while the per-output token latency estimation 412 determines the time needed to generate each output token. For example, if the hybrid estimation module 406 estimates prompt encoding takes 50 ms and token generation takes 20 ms, these components are combined to provide a comprehensive latency estimate. The advantage of the hybrid estimation module 406 is that it uses multiple methods to enhance accuracy, integrating both theoretical and empirical data. Further, the hybrid estimation module 406 provides the estimated latency (for both, prompt-encoding, and per-output token) to the ensemble balance module 408.

The hybrid estimation module 406 employs one or more estimation techniques and one or more regression techniques for estimating the runtime latency (specifically, the per-output token latency and the prompt-encoding latency). The estimation techniques may be implemented as at least one of an autoregressive inference technique, a floating points operations (FLOP) technique, and the like. The regression techniques may be implemented as at least one of a random forest technique, a linear regression technique, a ridge regression technique, a support vector regression (SVR) technique, a naïve-bayes technique, a decision tree regression technique, a stochastic gradient descent regression technique, and the like.

The prompt-encoding latency estimation 410 (i.e., first generating) is responsible for estimating the prompt-encoding latency, and the per-output token latency estimation 412 (i.e., second generating) is responsible for estimating the per-output token latency. An amalgamation of the prompt-encoding latency and the per-output token latency results in the latency of the LLM for a given prompt. Each of the prompt-encoding latency estimation 410 and the per-output token latency estimation 412 comprise an analytical model and a regression model for estimating respective latencies. Specifically, the analytical model uses the estimation techniques, and the regression model uses the regression techniques for estimating the runtime latency.

In an example, LLM 1 of 70 billion parameters may execute a user query having 250 input tokens, such that a maximum number of output tokens may be 120 output tokens. In this way, the LLM1 observes a prompt-encoding latency of 0.02 seconds, and a per-output token latency of 0.12 seconds. During training, the hybrid estimation module may employ individual analytical models and regression models for estimating the prompt-encoding latency and the per-output token latency.

For estimating the prompt-encoding latency, the analytical model may utilize the autoregressive inference technique. In this regard, the analytical model may estimate the prompt-encoding latency by using equation 1, as iterated below:

$$\text{prompt encoding latency } (p) = \frac{(24h^2l)p}{\text{computation capacity}} \quad \text{Equation (1)}$$

Here, p refers to a number of input tokens, l refers to number of transformer layers, and h refers to a hidden size of the LLM.

The computation capacity of any LLM pertains to the hardware utilized by the LLM. In the given example, if LLM1 is being utilized with an NVIDIA hardware, the computational capacity depends on the computation capacity of the NVIDIA hardware, which is $9.7\times10^{12}$.

So, applying to the given equation, the analytical model estimates the prompt-encoding latency to be $$\frac{(24\times4096^2\times120)}{9.7\times10^{12}} = \frac{48.3\times10^9}{9.7\times10^{12}} = \frac{48.3}{9700} = 0.0049 \text{ seconds.}$$

For estimating the prompt-encoding latency, the regression model may utilize the regression techniques based on the custom merged data 404. In this regard, the regression model may estimate the prompt-encoding latency as 0.0063 seconds.

Further, for estimating the per-output token latency, the analytical model may utilize the autoregressive inference technique. In this regard, the analytical model may estimate the per-output token latency by using equations 2, as iterated below:

$$\text{per-output token latency} = \frac{24h^2l\left(1+\frac{i}{6\text{ h}}\right)}{i\times\text{computation capacity}} \quad \text{Equation (2)}$$

Here, i refers to a number of maximum output tokens.

So, applying to the given equation, the analytical model estimates the prompt encoding latency to be $$\frac{24\times4096^2\times120\left(1+\frac{120}{6\times4096}\right)}{120\times9.7\times10^{12}} = \frac{48.53\times10^9}{11.64\times10^{14}} = \frac{48.53}{1164000} = 0.00042 \text{ seconds.}$$

For estimating the per-output token latency, the regression model may utilize the regression techniques based on the custom merged data 404. In this regard, the regression model may estimate the per-output token latency as 0.00072 seconds.

The ensemble balance module 408 refers to a component that integrates and balances outputs from the analytical and regression models to estimate the latency for an LLM. In this regard, the ensemble balance module 408 adjusts the weights of different latency estimates based on historical performance data and experimental results. For instance, if the historical data shows that prompt encoding latency is typically overestimated, the ensemble balance module 408 may adjust the weight of this estimate to improve overall accuracy. The advantage of the ensemble balance module 408 is that it enhances the reliability of latency predictions by refining and balancing various estimation results.

The ensemble balance module 408 may utilize one or more averaging techniques for estimating the latency. The averaging techniques may be implemented as one of a weighted average technique, a moving average technique, a weighted least squares technique, a root mean square technique, and the like. In this regard, the ensemble balance module 408 may create a balance between outputs of the analytical and regression models by averaging the same. Thereafter, the ensemble balance module 408 utilizes averaged prompt-encoding latency and averaged per-output token latency to estimate an end-to-end latency for the LLM.

With respect to the previous example, the ensemble balance module 408 may balance outputs from the analytical and regression models to estimate the prompt-encoding latency and the per-output token latency. In this regard, the prompt-encoding latency may be estimated by averaging 0.0049 and 0.0063, resulting in an averaged prompt-encoding latency of 0.0054. Similarly, the per-output token latency may be estimated by averaging 0.00042 and 0.00072, resulting in an averaged per-output token latency of 0.00058.

Thereafter, the ensemble balance module 408 may estimate the end-to end latency by using equation 3, as iterated below:

$$\text{Latency} = \alpha + ((i-1)\beta \qquad \text{Equation 3}$$

Here, i refers to a total number of tokens,

α refers to the prompt-encoding latency, and

β refers to the per-output token latency.

So, applying the given equation, the ensemble balance module 408 estimates the end-to-end latency to be 0.0054+(120−1) 0.00058=0.0744.

At runtime, when a new LLM and its corresponding prompt details are provided to the latency estimation module 230, the module uses the hybrid estimation module 406 and the ensemble balance module 408 to estimate the end-to-end latency for processing the prompt. This ensures that the latency estimation is both accurate and contextually relevant. The latency estimation module 230's advantage is its ability to provide precise runtime estimates, leading to better performance optimization and resource allocation.

The ensemble balance module 408 is coupled to the estimation module 414, which, in turn, is connected to the third-party LLM orchestrator 416, 310. The estimation module 414 is responsible for generating detailed performance estimates based on input parameters such as LLM architecture and hardware performance metrics. For instance, the estimation module 414 uses the prompt-encoding latency and the per-output token latency to estimate the end-to-end runtime latency for processing user prompts through specific LLMs. The estimation module 414 aggregates various latency data to provide a well-rounded estimate of expected performance. By accurately predicting latency, the estimation module 414 helps in optimizing the deployment of LLMs. The third-party LLM orchestrator 416 provides information to the estimation module 414, thereby optimizing operations of the ranking system 114. In this regard, the third-party LLM orchestrator 416 advantageously makes more informed decisions, leading to enhanced overall efficiency and effectiveness in LLM deployment.

Further, the latency estimation module 230 provides the estimated end-to-end latency of each LLM and hardware combination to the energy-heuristic estimation module 232.

Figure 5:
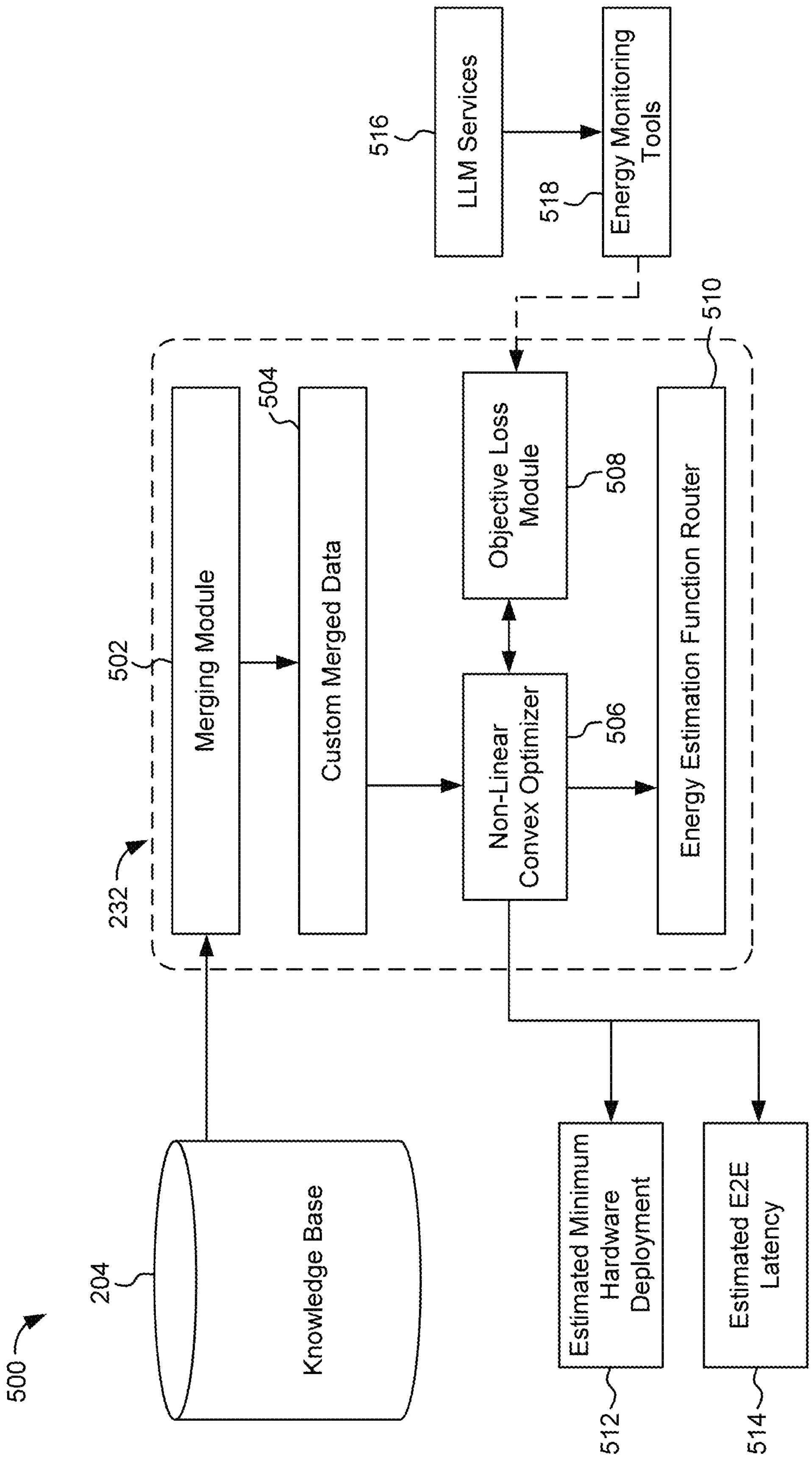
FIG. 5 is a block diagram that presents an example of an energy heuristic estimation module for a third estimating, in accordance with implementations of the present disclosure.

FIG. 5 is a block diagram 500 that presents an example of the energy heuristic estimation module 232 for the third estimating, in accordance with implementations of the present disclosure. The ranking system 114 utilizes the energy heuristic estimation module 232 for the third estimating.

The energy heuristic estimation module 232 performs the third estimating by determining an estimated amount of energy consumed by each of the LLM/hardware combinations for the AI prompt. The estimated amount of energy consumed by each of the LLM/hardware combinations for the AI prompt may be referred to as an estimated energy consumption or energy consumption. The energy heuristic estimation module 232 leverages a combination of empirical benchmark data and advanced optimization techniques to provide accurate energy estimates. For instance, if the energy heuristic estimation module 232 receives hardware efficiency performance data and LLM benchmark performance metrics, it can estimate the energy required for processing a prompt based on these inputs. In operation, the energy heuristic estimation module 232 estimates the energy consumption based on the estimated minimum number of hardware units and the estimated time.

The energy heuristic estimation module 232 advantageously provides detailed energy consumption estimates that are crucial for optimizing energy usage and minimizing operational costs. By delivering precise energy estimates, the energy heuristic estimation module 232 aids in effective resource planning and scaling, ensuring that LLM deployments are managed to reduce energy waste. Furthermore, the energy heuristic estimation module 232 integrates data from various benchmarks and leverages empirical observations to enhance the accuracy of its estimates, even when detailed architectural information is unavailable. For instance, if the energy heuristic estimation module 232 estimates that processing a prompt consumes 15 watts of power and requires 50 milliseconds, these insights facilitate more efficient resource allocation and informed decisions regarding hardware deployment.

The energy heuristic estimation module 232 may receive hardware efficiency performance, and LLM benchmark performance information from the knowledge base 204. Hardware Efficiency Performance refers to the effectiveness of hardware systems in executing tasks with minimal energy consumption and optimal computational speed. This performance is assessed through metrics such as power usage, processing speed, and resource utilization, providing a measure of how efficiently the hardware performs under various conditions. LLM Benchmark Performance Information encompasses the metrics and data obtained from evaluating large language models (LLMs) against standardized benchmark tests. This information includes performance indicators such as inference speed, energy consumption, and accuracy across different tasks. It offers insights into the model's overall efficiency, effectiveness, and suitability for various applications.

Exemplary tabular representations of the hardware efficiency performance information, and the LLM benchmark performance information are iterated in Tables 7 and 8, respectively, as illustrated below:

TABLE 7 exemplary representation of hardware efficiency performance information

| LLM | No. of parameters | HW Model | Throughput | Energy consumed |
|---|---|---|---|---|
| LLM 1 | 70 B | A100 | 50 | 96 J |
| LLM 2 | 30 B | A100 | 45 | 22 J |
| LLM 3 | 12 B | H100 | 60 | 45 J |
| LLM 1 | 70 B | Gaudi | 100 | 32 J |

TABLE 8 exemplary representation of LLM benchmark performance information

| LLM | No. of parameters | MMLU (F1-match) | GSM8k (Acc.) | QA (F1-match) |
|---|---|---|---|---|
| LLM 1 | 70 B | 0.75 | 0.75 | 0.75 |
| LLM 2 | 30 B | 0.6 | 0.6 | 0.6 |
| LLM 3 | 12 B | 0.5 | 0.5 | 0.5 |
| LLM 4 | 7 B | 0.45 | 0.45 | 0.45 |

As shown in FIG. 5, the energy heuristic estimation module 232 comprises a merging module 502, custom merged data 504, a non-linear convex optimizer 506, an objective loss module 508, and an energy estimation function router 510.

The merging module 502 extracts and combines relevant data points from various benchmarks, including those evaluating energy consumption, latency, and memory usage. For example, the merging module 502 might integrate data from benchmarks assessing energy consumption for LLMs of different sizes, such as a 7B parameter LLM and a 70B parameter LLM, to produce a comprehensive dataset reflecting the energy requirements across these configurations. The advantage of the merging module 502 is that it consolidates information from multiple benchmarks, thereby enhancing the accuracy and reliability of energy estimates. By aggregating data from diverse sources, the merging module 502 ensures that the energy consumption estimates account for a broad range of operational scenarios, leading to more informed and efficient resource allocation.

The custom merged data 504 is a unified dataset produced by the merging module 502, incorporating the hardware efficiency performance information and the LLM benchmark performance information. For instance, the custom merged data 504 could include detailed metrics on an LLM's energy consumption during inference and the associated hardware's efficiency ratings. This dataset enables precise energy consumption predictions for various configurations. The advantage of the custom merged data 504 is that it integrates LLM performance metrics with hardware efficiency data, resulting in a comprehensive and cohesive dataset. This integration allows for more accurate energy consumption predictions and optimizes hardware deployment, ultimately leading to improved operational efficiency and cost-effectiveness. Notably, the custom merged data 404 is different from the custom merged data 504.

In this regard, the merging module 502 matches LLM names from the LLM benchmark performance information and the hardware efficiency performance information by cross-referencing between the two sets of information to generate the custom merged data 504. In an example, the merging module 502 may select an LLM listing 'LLM 1' from the LLM benchmark performance information (notable, it will select and append both data points for LLM1 from the hardware efficiency performance information), and map the LLM listing (LLM1) with the LLM hardware efficiency performance information. In this regard, the merging module 502, may extract information pertaining to the LLM (for example, number of parameters) and include the same when generating the custom merged data 504.

The merging module 502 follows an approach similar to the combinatorial module 302, as discussed above in detail with respect to FIG. 3, for generating the custom merged data 504. An exemplary tabular representation of the custom merged data 504 is iterated in Table 9, as illustrated below:

TABLE 9 exemplary representation of custom merged data 504

| LLM | No. of parameters | HW Model | . . . | Energy consumed | MMLU | . . . |
|---|---|---|---|---|---|---|
| LLM 1 | 70 B | A100 | . . . | 96 J | 0.75 | . . . |
| LLM 2 | 30 B | A100 | . . . | 22 J | 0.6 | . . . |
| LLM 3 | 12 B | H100 | . . . | 4 5J | 0.5 | . . . |

The custom merged data 502 may also be referred to as a map of data points representing energy specifications for each LLM/hardware combination. The merging module 502 provides the custom merged data 504 to the non-linear convex optimizer 506. The non-linear convex optimizer 506 refers to a component that solves a non-linear convex optimization based on the custom merged data 504. The non-linear convex optimizer 506 adjusts its parameters iteratively to minimize energy consumption while considering hardware constraints and LLM benchmarks. For example, if the non-linear convex optimizer 506 is given a dataset indicating that a specific LLM consumes varying amounts of energy based on its architecture, the non-linear convex optimizer 506 will adjust the optimization function to find the minimal energy consumption configuration. In this way, the non-linear convex optimizer 506 accurately predicts/estimates the energy consumption (using the adjusted optimization function), based on the dataset. The advantage of the non-linear convex optimizer 506 is that it fine-tunes energy estimates, providing more accurate results. Advantageously, the merged data 504 enables optimization of end-to-end energy estimation.

Further, estimated minimum hardware deployment 512 estimated by the minimum deployment approximation module 228 and estimated end-to-end (E2E) latency 514 estimated by the latency estimation module 230 are provided as inputs to the non-linear convex optimizer 506. The estimated minimum hardware deployment 512 signifies an optimized amount of hardware resources required for processing tasks. Estimation of the minimum hardware deployment 512 is discussed in detail with respect to FIG. 3. The advantage of providing the estimated minimum hardware deployment 512 as input is that it ensures hardware resources are used efficiently, preventing over-provisioning, and reducing operational costs. The estimated E2E latency 514 represents a total predicted time required to process user prompts from start to finish. Estimation of the E2E latency 514 is discussed in detail with respect to FIG. 3. By using the estimated E2E latency 514 as input, the non-linear convex optimizer 506 fine-tunes both resource allocation and performance expectations to ensure optimal system efficiency.

The custom merged data 504, the estimated minimum hardware deployment 512 and the estimated end-to-end (E2E) latency 514 are provided to the non-linear convex optimizer module 506.

The non-linear convex optimizer 506 refers to a component which calculates the estimated end-to-end energy consumption of an LLM/hardware combination for running a prompt based on the merged data 504, the estimated minimum number of hardware units (i.e., the estimated minimum hardware deployment 512) and the estimated time (i.e., the estimated end-to-end (E2E) latency 514). In this regard, the non-linear convex optimizer 506 utilizes non-linear convex functions to determine the estimated energy consumption. This is used to calculate the energy consumption for deploying/executing the LLM/hardware combination for the given prompt. For example, if the non-linear convex optimizer 506 determines that generating each token requires 0.5 watts of power, this information helps in understanding the energy cost per token and can be used to optimize resource allocation.

The non-linear convex optimizer 506 estimates the energy consumption based on one or more supervised learning techniques or semi-supervised learning techniques. In some instances, the non-linear convex optimizer 506, similar to the convex optimization module 306, estimates the energy consumption based on one or more regression modelling techniques. Examples of the regression modelling techniques include a random forest technique, a linear regression technique, a ridge regression technique, a support vector regression (SVR) technique, a naïve-bayes technique, a decision tree regression technique, a stochastic gradient descent regression technique, and the like.

During training, the non-linear convex optimizer 506 will utilize the custom merged data 504 to understand correlations between LLM/hardware combinations, prompt characteristics, and eventual energy requirements. During training, variables of the non-linear convex optimizer 506 may be re-adjusted to optimize performance. Once the non-linear convex optimizer 506 is able to accurately estimate the energy consumption, it is implemented within the ranking system 114 for runtime utilization (i.e., an inference phase).

The non-linear convex optimizer 506 is communicably coupled to the objective loss module 508. The objective loss module 508 refers to a component which optimizes estimation of the energy-heuristic estimation module 232. The objective loss module 508 optimizes the estimated energy consumption by recalibrating a loss associated with the estimated energy consumption based on the custom merged data 502 and new observed data (if available).

As shown in FIG. 5, the objective loss module 508 is communicably coupled to LLM services 516, which provide information captured from energy monitoring tools 516 to the objective loss module 508. The LLM services 516 refers to an interface or framework which manages functions of the plurality of LLMs. The energy monitoring tools 516 refer to tools deployed with the LLM services 516, which measure energy consumption of the plurality of LLMs with different hardware combinations and on different prompts, as being utilized in real time. This information provides additional context to the objective loss module 508 for optimizing estimation of the energy consumption.

Specifically, these energy monitoring tools 518 monitor the LLM to provide real-time energy consumption data and feedback to the energy heuristic estimation module 232, allowing for continuous refinement of energy estimates. For example, if the energy monitoring tools 518 report that actual energy consumption deviates from the estimated values, this information can be used to adjust the optimization function and improve accuracy for future estimates. The advantage of integrating energy monitoring tools 518 is that it enhances the reliability of energy estimates by incorporating real-world data, leading to more accurate predictions and better overall performance.

The objective loss module 508 processes this information using the one or more regression techniques. Thereafter, the objective loss module 508 provides an accurate and optimized version of the estimated energy consumption to the non-linear convex optimizer 506. The non-linear convex optimizer 506 provides the estimated energy consumption to the energy estimation function router 510. Primarily, the energy estimation function router routes (or, shares) the estimated energy consumption to the green indexing module 234.

In some instances, the energy estimation function router 510 estimates the energy consumption. In such instances, often information pertaining to an LLM, or its energy consumption practices may not be available. In this regard, the energy estimation function router 510 utilizes a heuristic function to accurately estimate the energy consumption.

In an example, LLM 1 of 70 billion parameters may execute a user query having 250 input tokens, such that a maximum number of output tokens may be 120 output tokens. In this way, the LLM1 requires 5 hardware devices, each requiring 400 W of power, with 0.26 efficiency, and a latency of 15.39 seconds. During training, the energy estimation function router 510 may employ the heuristic function for estimating the energy consumption. In this regard, the energy estimation function router 510 may estimate the energy consumption by using equation 4, as iterated below:

$$\text{energy consumption} = n \times p \times e \times l \qquad \text{Equation (4)}$$

Here, n refers to a number of hardware devices;

p refers to a power consumption of each hardware device;

e refers to an efficiency of each hardware device; and l refers to a latency associated with the LLM to respond to the given prompt.

So, applying the given equation, the energy estimation function router 510 may estimate the power consumption to be 5×400×0.26×15.39=8002.8 watts.

The energy estimation function router 510 considers granularity of information available at runtime to determine most accurate energy estimates. For example, if the energy estimation function router 510 is provided with detailed hardware characteristics and benchmark data, it can make an informed decision about the optimal processing route for a given query. The advantage of the energy estimation function router 510 is that it provides a flexible and adaptive approach to energy estimation, accommodating varying levels of information and ensuring that estimates are as accurate as possible.

At runtime, the energy heuristic estimation module 232, already has the stored map of data points representing energy specifications for each LLM/hardware combination (the custom merged data 502), and having access to the estimated minimum number of hardware units 512 and the estimated time 514. Utilizing this information, the energy heuristic estimation module 232 determines the estimated amount of energy consumed by each of the LLM/hardware combinations for the AI prompt (i.e., the end-to-end energy consumption). In operation, when a new LLM and its corresponding prompt details are provided to the energy heuristic estimation module 232, the energy heuristic estimation module 232 uses the energy estimation function router 510 to estimate the energy consumption.

In this regard, the energy estimation function router 510 utilizes outputs from the non-linear convex optimizer 506 and the objective loss module 508 to estimate the end-to-end energy, based on its understanding of correlations between LLMs, hardware, prompt, and energy consumption. This ensures that energy estimates are accurate and relevant to any specific query being processed. The advantage of the energy heuristic estimation module 232 is its ability to deliver precise energy consumption estimates, leading to more efficient energy usage and better resource management.

In some instances, the energy heuristic estimation module 232 may be utilized to estimate additional metrics associated with the LLM/hardware combinations. Such additional metrics may be implemented as a network cost, a storage energy cost, and the like.

Figure 6:
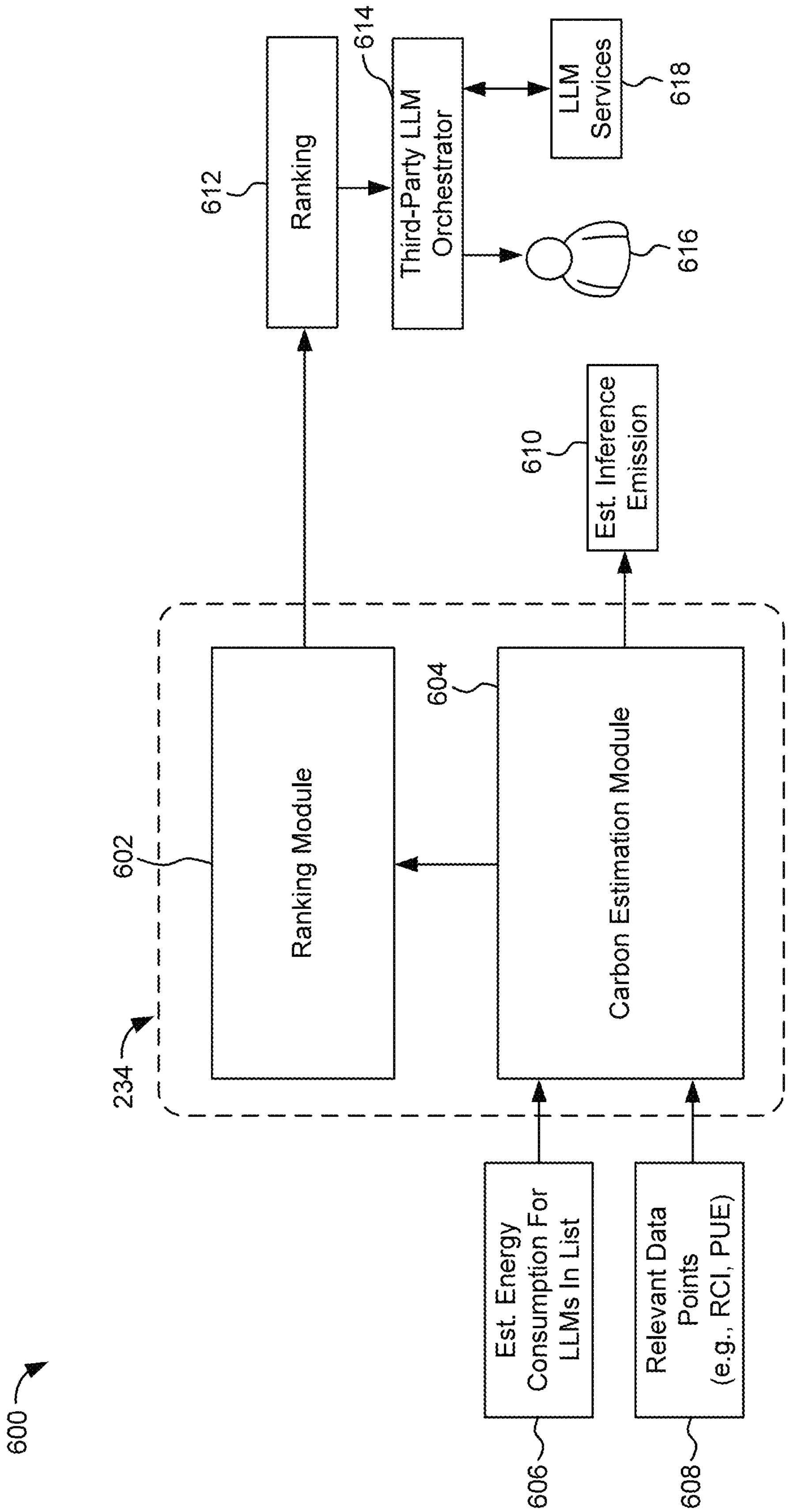
FIG. 6 is a block diagram that presents an example of a green indexing module for ranking the LLM/hardware combinations, in accordance with implementations of the present disclosure.

FIG. 6 is a block diagram 600 that presents an example of the green indexing module 234 for ranking the LLM/hardware combinations, in accordance with implementations of the present disclosure. The ranking system 114 utilizes the green indexing module 234 for ranking the LLM/hardware combinations.

The green indexing module 234 ranks the LLM/hardware combinations. In operation, the green indexing module 234 estimates carbon emissions for each permutation of user-specified prompts and selected LLM/hardware lists, providing a green, or sustainability index for end-users. The green indexing module 234 evaluates and ranks LLMs based on their environmental impact, focusing on minimizing carbon footprint while maximizing response performance and accuracy. For instance, if the green indexing module 234 processes data indicating that LLM A has a lower carbon footprint for processing a specific prompt compared to LLM B, it will prioritize LLM A in the green index. An advantage of the green indexing module 234 is its ability to offer a context-specific weighted ranking of LLM models and services, aiding users in selecting the most environmentally friendly and efficient options.

The green indexing module 234 comprises a ranking module 602 and a carbon estimation module 604. The ranking module 602 evaluates and ranks LLMs based on their energy consumption and associated carbon emissions. For example, the ranking module 602 might receive data on various LLMs and their energy usage, then apply a ranking algorithm to determine which models have the lowest environmental impact. An advantage of the ranking module 602 is that it facilitates informed decision-making by highlighting the most sustainable LLM options, ensuring that users can select models that align with their environmental goals.

The carbon estimation module 604 calculates the estimated carbon emissions associated with processing a user prompt using a selected LLM. The carbon estimation module 604 considers parameters such as the estimated energy consumption of the LLM, regional carbon intensity, and Power Usage Effectiveness (PUE) if data center deployment is involved. For example, if the carbon estimation module 604 estimates that an LLM generates 5 grams of $CO_2$ per prompt processed based on its energy usage and regional carbon intensity, this value can be used to evaluate and compare different LLMs' environmental impacts. An advantage of the carbon estimation module 604 is that it provides detailed emissions data, which is crucial for multi-criteria decision heuristics and domain-specific rankings, enabling more precise and contextually relevant green indexing.

An estimated energy consumption for LLMs in the list 606 and relevant data points 608 are provided to the carbon estimation module 604. The estimated energy consumption for LLMs in the list 606 refers to the predicted energy usage of different LLMs when processing a specific prompt. Relevant data points 608 include factors such as regional carbon intensity and Power Usage Effectiveness. For instance, if the carbon estimation module 604 receives energy consumption data and regional carbon intensity values, it can compute the carbon emissions for each LLM accurately. An advantage of providing this data is that it enables the carbon estimation module 604 to generate precise emissions estimates, which are essential for creating an accurate green index.

The carbon estimation module 604 generates the estimated inference emission 610, which represents predicted carbon emissions associated with processing a specific prompt using a given LLM. For example, if the carbon estimation module 604 estimates that LLM A has an inference emission of 10 grams of $CO_2$ per prompt, this figure can be used to rank and compare LLMs based on their environmental impact. An advantage of generating the estimated inference emission 610 is that it provides actionable insights into the carbon footprint of different LLMs, facilitating more sustainable AI model selection.

The ranking module 602 receives data from the carbon estimation module 604, including the estimated inference emissions 610 and other relevant metrics. The ranking module 602 processes this data to generate rankings 612, which prioritize LLMs based on their carbon emissions and performance. For example, if the ranking module 602 uses estimated emissions and performance metrics to rank LLM A higher than LLM B due to lower carbon emissions and better efficiency, this helps users choose the most eco-friendly and efficient models. An advantage of generating these rankings is that they support decision-making by providing a clear view of the most sustainable options available.

The ranking module 602 generates the rankings 612 based on the data by utilizing one or more weighted aggregation techniques. The weighted aggregation techniques may be implemented as at least one of a weighted scoring technique, a min-max normalization technique, a z-score normalization technique, a spearman's rank correlation technique, and the like.

The rankings 612 refer to the ordered list of LLMs based on their environmental impact and performance. For instance, rankings 612 might show that LLM A is ranked highest due to its low carbon footprint and high accuracy, while LLM B is ranked lower. An advantage of providing these rankings is that they offer users a prioritized list of LLMs that balance environmental concerns with performance, enabling them to select the best options for their specific needs.

During runtime, based on the input provided by the user, the green indexing module 234 weights the LLM/hardware combinations based on ranking, with lower energy consuming combinations being weighted higher than higher energy consuming combinations. In operation, the green indexing module 234 prepares the rankings for LLM/hardware combinations based on the input, each LLM/hardware combination having a weight associated with respect to an amount of estimated energy consumption. For example, if LLM1 using hardware 1 requires 8000 watts of energy to process the prompt, and LLM2 using hardware 1 requires 6000 watts of energy, the green indexing module 234 may assign a lower weight (and hence a smaller rank, for example, rank 2) to the LLM1/hardware1 combination and a higher weight (and hence, better rank, for example, rank 1) to the LLM2/hardware2 combination.

Based on the weighting, the green indexing module selects the LLM/hardware combination. With respect to the above example, the LLM2/hardware2 combination may be selected since it has higher weights and better rank (i.e., rank 1).

In some instances, the weights assigned to each LLM/hardware combination based on at least one of: the estimated energy consumption, a domain of the LLM with respect to the AI prompt, performance benchmarks, user requirements, and the like. For example, if LLM 1 trained on medical domain using hardware1 requires 8000 watts of energy, and LLM 2 trained on marketing domain using hardware 2 requires 7500 watts of energy, when the AI prompt pertains to a medical domain, the green indexing module 234 may assign a higher ranking to the LLM1/hardware1 combination. Although the LLM1/hardware1 combination require a little more energy consumption, it would be provided a higher rank due to domain similarity with the AI prompt.

The rankings 612 are shared with a third-party LLM orchestrator 614, which is communicably coupled to user 616 and the LLM services 618. The third-party LLM orchestrator 614 uses these rankings to integrate and optimize LLMs based on their green index scores. For example, the third-party LLM orchestrator 614 might re-route requests to LLMs with higher green index scores, ensuring that users access models with lower carbon emissions. An advantage of sharing these rankings with the third-party orchestrator 614 is that it enhances integration of sustainability metrics into LLM services, facilitating greener AI solutions and increased alignment with environmental goals.

In this regard, the third-party LLM orchestrator 614 may select an LLM from the list of LLMs and hardware from the list of hardware based on the ranking. For instance, the third-party LLM orchestrator 614 may pick LLM2 and hardware2 since their combination has best ranking. Thereafter, the third-party LLM orchestrator 614 submits the AI prompt to the selected LLM on the selected hardware. With respect to the ongoing example, the AI prompt may be submitted to LLM2 run on hardware 2. Lastly, the third-party LLM orchestrator 614 receives the response from the LLM to the submitted AI prompt, which it provides back to the user.

Beneficially, the green indexing module 234 provides a comprehensive and actionable assessment of LLMs based on their environmental impact. By integrating carbon emissions estimates with performance metrics, the green indexing module 234 enables users to make informed decisions that balance sustainability with operational efficiency. This leads to more environmentally conscious AI deployments, ultimately supporting broader sustainability objectives.

Figure 7:
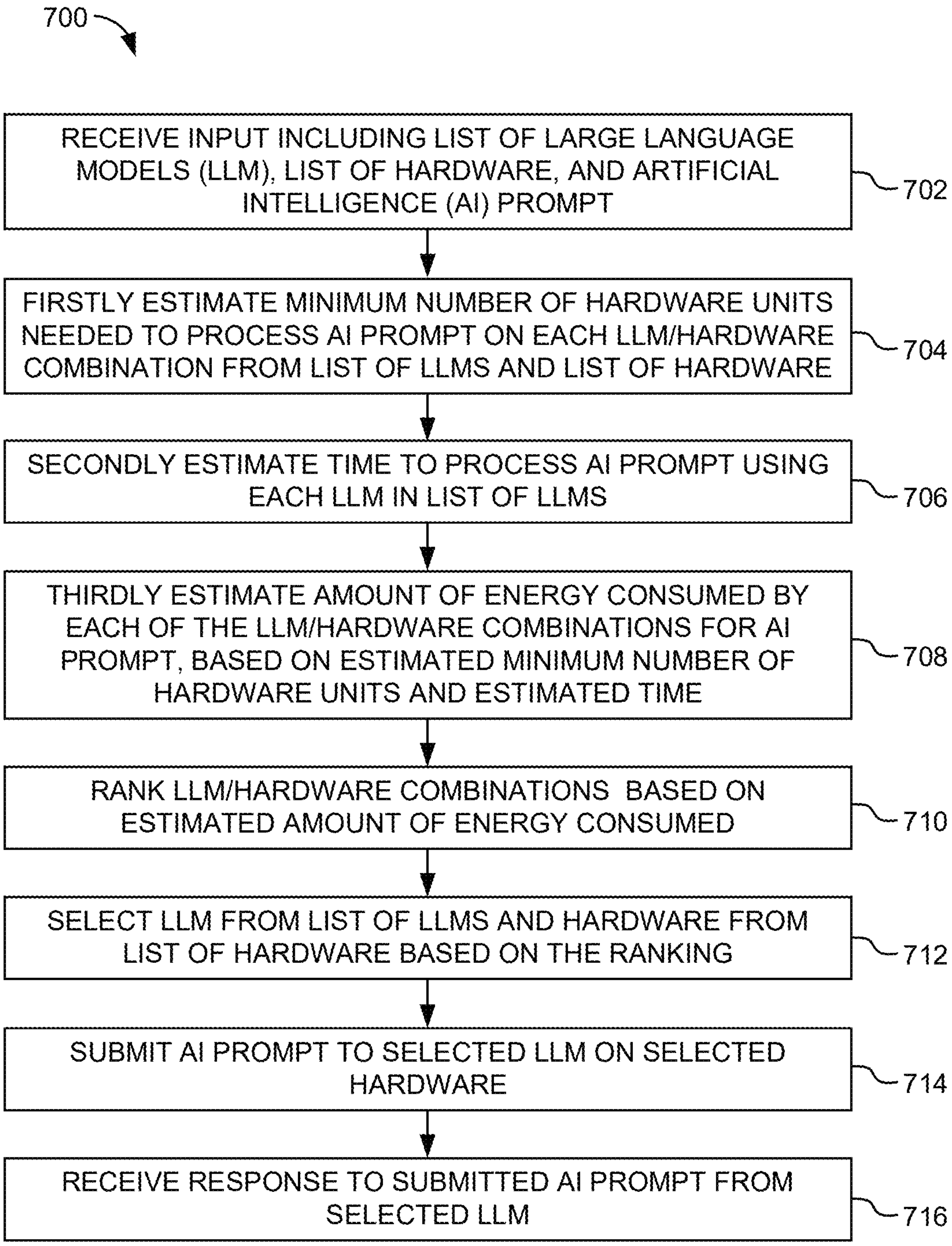
FIG. 7 is a flow diagram that presents an example method in accordance with implementations of the present disclosure.

FIG. 7 is a flow diagram 700 that presents an example method in accordance with implementations of the present disclosure. Optionally, the flow diagram 700 presents an example method for ranking the LLMs in accordance with implementations of the present disclosure.

At step 702, an input is received from the user. The input includes the list of LLMs, the list of hardware, and the AI prompt. This input is typically provided through the UI/UX module 206 of the ranking system 114 (i.e., user interface or a programmatic API), ensuring that all necessary components are available for processing. For instance, the user might submit a prompt along with LLMs like GPT-3 and BERT, and hardware options such as NVIDIA GPUs and TPUs.

At step 704, the first estimation is performed. The first estimation involves calculating the estimated minimum number of hardware units required to process the AI prompt for each combination of LLM and hardware. This estimation is based on the computational demands of the AI prompt and the processing capabilities of each LLM and hardware unit. For example, if LLM A requires significant computational resources for the prompt, the ranking system 114 may estimate that 4 GPUs are necessary to achieve acceptable performance. This step involves analyzing the prompt's complexity and the LLM's resource requirements.

The first estimation comprises storing a map of data points for the each LLM/hardware combination. This comprises information pertaining to the LLMs and hardware combinations for responding to prompts of different lengths and complexities. Based on the map of data points, the estimated minimum number of hardware units for each LLM to process the AI prompt is identified. This information enables the ranking system 114 to appropriately rank the LLM/hardware combinations based on energy consumption. The first generating is discussed in detail with respect to FIG. 3.

At step 706, the second estimation is performed. The second estimation comprises estimating the processing time required for each LLM to handle the AI prompt. This time estimation considers the LLM's efficiency in processing inputs and respective computational power of the associated hardware. For instance, LLM B may complete the prompt in 30 milliseconds on hardware X but takes 50 milliseconds on hardware Y. This step provides crucial data on the expected response times for different LLM and hardware combinations.

The second estimation of the time required to process the AI prompt using each LLM involves calculating the estimated processing time based on several factors. Specifically, for each LLM, this estimation is determined by considering the processing time of the LLM, the average time required to generate each token for the AI prompt, and the total number of tokens in the AI prompt. The processing time is computed by multiplying the average token generation time by the number of output tokens in the AI prompt. This approach allows for a detailed assessment of how long each LLM will take to process the AI prompt, factoring in both the inherent processing capabilities of the LLM and the specific characteristics of the AI prompt.

The second estimating comprises first generating the average time to generate a token for the prompt (i.e., the prompt-encoding latency), and the second generating the average time to generate the number of tokens generated for the AI prompt (i.e., the per-output prompt latency). Based on the first generating and the second generating, the estimated latency of the each LLM/hardware combination to process the AI prompt is determined. The second generating is discussed in detail with respect to FIG. 4.

At step 708, the third estimation is performed. The third estimation comprises estimating/calculating amount of energy consumed by each LLM/hardware combination. This is done by integrating the previously estimated hardware requirements and processing times to determine the energy usage. For example, if LLM C with hardware Z requires 5 GPUs and takes milliseconds to process the prompt, and each GPU consumes 200 watts, the total estimated energy consumption can be computed as $$5\times 200\ \text{watts}\times \frac{40}{1000}\text{hours} = 2\ \text{kWh}.$$

This step uses energy consumption models that factor in hardware power ratings and operational times.

The third estimation comprises storing a map of data points representing energy specifications for each LLM/hardware combination. This comprises information pertaining to the LLMs and hardware combinations, and energy consumed by each for responding to prompts of different lengths and complexities. Based on the map of data points, the estimated minimum number of hardware units, and the estimated time, the estimated amount of energy consumed by each of the LLM/hardware combinations for the AI prompt is determined. The third generating is discussed in detail with respect to FIG. 5.

At step 710, the LLM/hardware combinations are ranked based on the estimated energy consumption. The ranking is designed to prioritize combinations with respect to sustainability that achieve the desired performance while minimizing energy use. For example, if LLM D with hardware W uses less energy compared to other combinations while maintaining similar performance metrics, it will be ranked higher. This step involves sorting the combinations and assigning ranks to facilitate optimal selection.

The ranking of the LLM/hardware combinations based on the estimated amount of energy consumed comprises converting the estimated amount of energy consumed into an estimate of carbon emissions produced by each of the LLM/hardware combinations. This conversion utilizes a carbon intensity factor, which is applied to the estimated energy consumption to calculate the corresponding carbon emissions. For instance, if the estimated energy consumption for a particular LLM/hardware combination is 100 kWh and the regional carbon intensity factor is 0.5 kg $CO_2$/kWh, then the estimated carbon emissions would be 50 kg $CO_2$. This step translates energy consumption into a comparable metric of environmental impact. The ranking of the LLM/hardware combinations is discussed in detail with respect to FIG. 6.

Further, the ranking of the LLM/hardware combinations based on the estimated amount of energy consumed comprises ranking the LLM/hardware combinations by the estimated amount of carbon emissions produced. This involves arranging the combinations in ascending order based on the carbon emissions estimates, with combinations exhibiting lower emissions receiving higher ranks. For example, if LLM D paired with hardware W is estimated to produce 50 kg $CO_2$, and other combinations produce higher amounts, LLM D with hardware W would be ranked more favorably. This ranking process ensures that selections prioritize combinations with lower carbon footprints while still meeting the performance criteria.

At step 712, based on the ranking, an LLM from the list and a hardware unit from the list are selected. The selection is made to choose the most efficient LLM/hardware combination according to the ranking. For example, if LLM D with hardware W is ranked highest for energy efficiency, it will be selected for processing the prompt.

The selection process comprises weighting the LLM/hardware combinations according to their ranking, where combinations that consume less energy are given higher weights compared to those with higher energy consumption. This means that the ranking system prioritizes combinations with lower carbon emissions, making them more favorable in the selection process. For example, if LLM D with hardware W is ranked higher due to its lower energy consumption, it will receive a higher weight in the selection criteria. The actual selection of the LLM and hardware unit is then based on these weights, ensuring that the combination with the lowest environmental impact is chosen for executing the AI prompt.

At step 714, the AI prompt is submitted to the selected LLM running on the selected hardware. This involves routing the prompt to the chosen LLM and hardware configuration, initiating the processing workflow. For instance, the prompt is sent to LLM D operating on hardware W.

At step 716, the response from the selected LLM is received after processing the AI prompt. The response is then provided back to the user. This final step ensures that the user receives timely and efficient results based on the optimized LLM and hardware configuration. Advantageously, this method enables efficient LLM processing by ensuring that both performance and energy consumption are optimized, resulting in effective resource utilization, and reduced operational costs.

The above methodologies provide a technical solution to the technical problem by selecting LLM models based on the amount of energy the LLM models would consume on a particular hardware platform to respond to a particular input prompt. The methodology, on a prompt-by-prompt basis, estimates the energy required for different available LLM/hardware combinations to process the input prompt. For any particular LLM/hardware combination, energy consumption is estimated based on, inter alia, (a) the minimum number of hardware units needed for the LLM to process the input prompt and (b) the amount of time needed to process the input prompt. The ranking of the energy consumption of the different LLM/hardware combinations for the specific prompt establishes a simple basis to define the higher or lower power requirements and then to select and apply an appropriate LLM/hardware combination based on lower power requirements for the particular prompt. The methodology will tend to reduce the power consumed for any particular prompt and, when used across multiple prompts, reduce the overall power needed for LLM processing relative to traditional methods.

Figure 8:
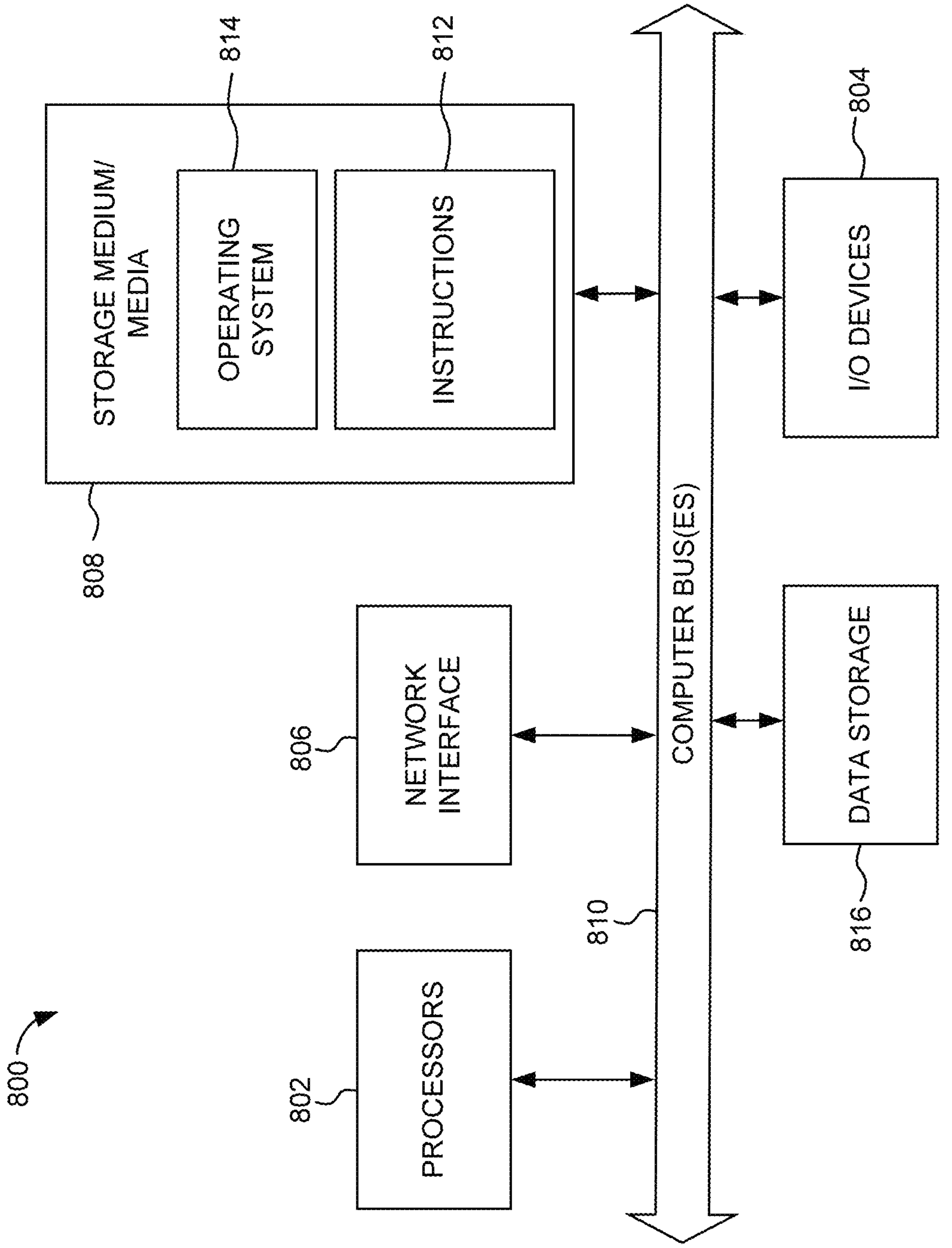
FIG. 8 illustrates a computer system that may be used to implement the ranking system.

FIG. 8 illustrates a computer system 800 that may be used to implement the ranking system 114. More particularly, computing machines such as desktops, laptops, smartphones, tablets, and wearables which may be used to process the conversational interactions in the ranking system 114 may have the structure of the computer system 800. The computer system 800 may include additional components not shown and that some of the process components described may be removed and/or modified. In another example, a computer system 800 may be deployed on external-cloud platforms such as cloud, internal corporate cloud computing clusters, organizational computing resources, and/or the like.

The computer system 800 includes processor(s) 802, such as a central processing unit, ASIC or another type of processing circuit, input/output devices 804, such as a display, mouse keyboard, etc., a network interface 806, such as a Local Area Network (LAN), a wireless 802.11x LAN, a 3G or 4G mobile WAN or a WiMax WAN, and a processor-readable medium 808. Each of these components may be operatively coupled to a bus 810. The computer-readable medium 808 may be any suitable medium that participates in providing instructions to the processor(s) 802 for execution. For example, the computer-readable medium 808 may be non-transitory or non-volatile medium, such as a magnetic disk or solid-state non-volatile memory or volatile medium such as RAM. The instructions or modules stored on the computer-readable medium 808 may include machine-readable instructions 812 executed by the processor(s) 802 that cause the processor(s) 802 to perform the methods and functions of the ranking system 114.

The ranking system 114 may be implemented as software stored on a non-transitory processor-readable medium and executed by the processors 802. For example, the computer-readable medium 808 may store an operating system 814, such as MAC OS, MS WINDOWS, UNIX, or LINUX, and code for the ranking system 114. The operating system 814 may be multi-user, multiprocessing, multitasking, multithreading, real-time, and the like. For example, during runtime, the operating system 814 is running and the code for the ranking system 114 is executed by the processor(s) 802.

The computer system 800 may include a data storage 816, which may include non-volatile data storage. The data storage 816 stores any data used or generated by the ranking system 114.

The network interface 806 connects the computer system 800 to internal systems for example, via a LAN. Also, the network interface 806 may connect the computer system 800 to the Internet. For example, the computer system 800 may connect to web browsers and other external applications and systems via the network interface 806.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations of the present disclosure provide multiple technical improvements and address drawbacks of traditional software configuration methods, by selecting LLM models based on the amount of energy the LLM models would consume on a particular hardware platform to respond to a particular input prompt. The present methodology, on a prompt-by-prompt basis, estimates the energy required for different available LLM/hardware combinations to process the input prompt. For any particular LLM/hardware combination, energy consumption is estimated based on, inter alia, (a) the minimum number of hardware units needed for the LLM to process the input prompt and (b) the amount of time needed to process the input prompt. The ranking of the energy consumption of the different LLM/hardware combinations for the specific prompt establishes a simple basis to define the higher or lower power requirements and then to select and apply an appropriate LLM/hardware combination based on lower power requirements for the particular prompt. The methodology will tend to reduce the power consumed for any particular prompt and, when used across multiple prompts, reduce the overall power needed for LLM processing relative to traditional methods.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them.

The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media, and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touchpad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back-end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network (LAN) and a wide area network (WAN), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method, comprising:

receiving, from user, an input including a list of large language models (LLM), a list of hardware, and an artificial intelligence (AI) prompt;

first estimating an estimated minimum number of hardware units needed to process the AI prompt on each LLM/hardware combination from the list of LLMs and the list of hardware;

second estimating an estimated time to process the AI prompt using each LLM in the list of LLMs, based on a processing time of the LLM, an average time to generate a token for the AI prompt, and a number of tokens generated for the AI prompt;

third estimating, based on the estimated minimum number of hardware units and the estimated time, an estimated amount of energy consumed by each of the LLM/hardware combinations for the AI prompt;

ranking the LLM/hardware combinations based on the estimated amount of energy consumed;

selecting, based on the ranking, an LLM from the list of LLMs and hardware from the list of hardware, wherein the selecting comprises:

weighting the LLM/hardware combinations based on ranking, with lower energy consuming combinations being weighted higher than higher energy consuming combinations; and the selecting is based on the weighting;

submitting the AI prompt to the selected LLM on the selected hardware; and receiving a response to the submitted AI prompt from the selected LLM.

2. The method of claim 1, wherein the ranking the LLM/hardware combinations based on the estimated amount of energy consumed comprises:

converting the estimated amount of energy consumed into an estimate of carbon produced by each of the LLM/hardware combinations; and ranking the LLM/hardware combinations by the estimated amount of carbon produced.

3. The method of claim 1, wherein the first estimating comprises:

storing a map of data points for the each LLM/hardware combination; and identifying from the map of data points, the estimated minimum number of hardware units for each LLM to process the AI prompt.

4. The method of claim 1, wherein the second estimating comprises:

first generating the average time to generate the token for the AI prompt;

second generating the average time to generate the number of tokens generated for the AI prompt; and determining an estimated latency of the each LLM/hardware combination to process the AI prompt based on the first and second generating.

5. The method of claim 1, wherein the third estimating comprises:

storing a map of data points representing energy specifications for each LLM/hardware combination; and determining the estimated amount of energy consumed by each of the LLM/hardware combinations for the AI prompt based on the map of data points, the estimated minimum number of hardware units, and the estimated time.

6. A non-transitory computer readable media storing instructions which when executed by a system of electronic computer hardware and software will cause the system to perform operations comprising:

receiving, from user, an input including a list of large language models (LLM), a list of hardware, and an artificial intelligence (AI) prompt;

first estimating an estimated minimum number of hardware units needed to process the AI prompt on each LLM/hardware combination from the list of LLMs and the list of hardware;

second estimating an estimated time to process the AI prompt using each LLM in the list of LLMs, based on a processing time of the LLM, an average time to generate a token for the AI prompt, and a number of tokens generated for the AI prompt;

third estimating, based on the estimated minimum number of hardware units and the estimated time, an estimated amount of energy consumed by each of the LLM/hardware combinations for the AI prompt;

ranking the LLM/hardware combinations based on the estimated amount of energy consumed;

selecting, based on the ranking, an LLM from the list of LLMs and hardware from the list of hardware, wherein the selecting comprises:

weighting the LLM/hardware combinations based on ranking, with lower energy consuming combinations being weighted higher than higher energy consuming combinations; and the selecting is based on the weighting;

submitting the AI prompt to the selected LLM on the selected hardware; and receiving a response to the submitted AI prompt from the selected LLM.

7. The non-transitory computer readable media of claim 6, wherein the ranking the LLM/hardware combinations based on the estimated amount of energy consumed comprises:

converting the estimated amount of energy consumed into an estimate of carbon produced by each of the LLM/hardware combinations; and ranking the LLM/hardware combinations by the estimated amount of carbon produced.

8. The non-transitory computer readable media of claim 6, wherein the first estimating comprises:

storing a map of data points for the each LLM/hardware combination; and identify from the map of data points, the estimated minimum number of hardware units for each LLM to process the AI prompt.

9. The non-transitory computer readable media of claim 6, wherein the second estimating comprises:

first generating the average time to generate the token for the AI prompt;

second generating the average time to generate a number of tokens generated for the AI prompt; and determining an estimated latency of the each LLM/hardware combination to process the AI prompt based on the first and second generating.

10. The non-transitory computer readable media of claim 6, wherein the third estimating comprises:

storing a map of data points representing energy specifications for each LLM/hardware combination; and determining the estimated amount of energy consumed by each of the LLM/hardware combinations for the AI prompt based on the map of data points, the estimated minimum number of hardware units, and the estimated time.

11. A system, comprising:

a processor;

a non-transitory computer readable memory storing instructions programmed to cooperate with the processor to perform operations comprising:

receiving, from user, an input including a list of large language models (LLM), a list of hardware, and an artificial intelligence (AI) prompt;

first estimating an estimated minimum number of hardware units needed to process the AI prompt on each LLM/hardware combination from the list of LLMs and the list of hardware;

second estimating an estimated time to process the AI prompt using each LLM in the list of LLMs, based on a processing time of the LLM, an average time to generate a token for the AI prompt, and a number of tokens generated for the AI prompt;

third estimating, based on the estimated minimum number of hardware units and the estimated time, an estimated amount of energy consumed by each of the LLM/hardware combinations for the AI prompt;

ranking the LLM/hardware combinations based on the estimated amount of energy consumed;

selecting, based on the ranking, an LLM from the list of LLMs and hardware from the list of hardware, wherein the selecting comprises:

weighting the LLM/hardware combinations based on ranking, with lower energy consuming combinations being weighted higher than higher energy consuming combinations; and the selecting is based on the weighting;

submitting the AI prompt to the selected LLM on the selected hardware; and receiving a response to the submitted AI prompt from the selected LLM.

12. The system of claim 11, wherein the ranking the LLM/hardware combinations based on the estimated amount of energy consumed comprises:

converting the estimated amount of energy consumed into an estimate of carbon produced by each of the LLM/hardware combinations; and ranking the LLM/hardware combinations by the estimated amount of carbon produced.

13. The system of claim 11, wherein the first estimating comprises:

storing a map of data points for the each LLM/hardware combination; and identify from the map of data points, the estimated minimum number of hardware units for each LLM to process the AI prompt.

14. The system of claim 11, wherein the second estimating comprises:

first generating the average time to generate the token for the AI prompt;

the number of tokens generated for second generating the average time to generate the AI prompt; and determining an estimated latency of the each LLM/hardware combination to process the AI prompt based on the first and second generating.

15. The system of claim 11, wherein the third estimating comprises:

storing a map of data points representing energy specifications for each LLM/hardware combination; and determining the estimated amount of energy consumed by each of the LLM/hardware combinations for the AI prompt based on the map of data points, the estimated minimum number of hardware units, and the estimated time.

* * * * *